(12) United States Patent
Inoue et al.

(10) Patent No.: US 11,994,388 B2
(45) Date of Patent: May 28, 2024

(54) ENCODER, SERVO MOTOR, SERVO SYSTEM, AND ENCODER CONTROL METHOD

(71) Applicant: KABUSHIKI KAISHA YASKAWA DENKI, Fukuoka (JP)

(72) Inventors: Ryo Inoue, Fukuoka (JP); Ikuma Murokita, Fukuoka (JP); Kenichi Sadakane, Fukuoka (JP); Masanobu Harada, Fukuoka (JP); Yuji Arinaga, Fukuoka (JP); Yasuhiro Matsutani, Fukuoka (JP)

(*) Notice: Subject to any disclaimer, the term of this patent is extended or adjusted under 35 U.S.C. 154(b) by 68 days.

(21) Appl. No.: 17/707,306

(22) Filed: Mar. 29, 2022

(65) Prior Publication Data
US 2022/0326003 A1    Oct. 13, 2022

(30) Foreign Application Priority Data
Apr. 9, 2021   (JP) ................. 2021-066627

(51) Int. Cl.
*G01B 7/30*    (2006.01)
*G01D 5/16*    (2006.01)
(Continued)

(52) U.S. Cl.
CPC ............. *G01B 7/30* (2013.01); *G01D 5/16* (2013.01); *G05B 19/4155* (2013.01);
(Continued)

(58) Field of Classification Search
CPC .. H01M 10/0585; H01M 10/42; H01M 10/46; G01B 7/30; G05B 19/4155;
(Continued)

(56) References Cited

U.S. PATENT DOCUMENTS 5,744,936 A    4/1998   Kawakami
11,385,081 B2 *   7/2022   Goto .................... B25J 19/02
(Continued)

FOREIGN PATENT DOCUMENTS

CN    111082148 A   *   4/2020   ........ H01M 10/0525
CN    111082148 A       4/2020
(Continued)

OTHER PUBLICATIONS

An Office Action dated Nov. 11, 2022, issued from the Japan Patent Office (JPO) of Japanese Patent Application No. 2021-066627 and a Machine translation thereof (13 pages).
(Continued)

*Primary Examiner* — Huy Q Phan
*Assistant Examiner* — David B Frederiksen
(74) *Attorney, Agent, or Firm* — Venjuris, P.C.

(57) ABSTRACT

An encoder includes: an optical module that detects angular position information indicating an angular position of a rotating disk within one rotation thereof; a magnetic detecting unit that detects multi-rotation information indicating the number of rotations of the disk; a battery that supplies a power to the magnetic detecting unit when an external power is not supplied to the encoder; and a connector that connects connection terminals of the battery to a substrate to which at least one of the optical module and the magnetic detecting unit is connected, via solders in contact with the connection terminals.

19 Claims, 14 Drawing Sheets

(51) Int. Cl.
*G05B 19/4155* (2006.01)
*H01M 10/0585* (2010.01)
*H01M 10/46* (2006.01)
*H02J 7/00* (2006.01)

(52) U.S. Cl.
CPC ....... *H01M 10/0585* (2013.01); *H01M 10/46* (2013.01); *G05B 2219/34013* (2013.01); *H02J 7/00712* (2020.01)

(58) Field of Classification Search
CPC ........ G01D 5/00; G01D 5/12; G01D 5/14–16; G01D 5/26; G01D 5/32; G01D 5/34; G01D 5/347; G01D 5/34776; G01D 5/34792
See application file for complete search history.

(56) References Cited

U.S. PATENT DOCUMENTS

| | | | | |
|---|---|---|---|---|
| 11,486,740 | B2* | 11/2022 | Mitterreiter | ............ G01B 7/31 |
| 2011/0202308 | A1* | 8/2011 | Kishida | ............... G01D 5/2449 |
| | | | | 702/151 |
| 2013/0242289 | A1* | 9/2013 | Miyajima | ............... G01D 5/12 |
| | | | | 356/72 |
| 2014/0097800 | A1* | 4/2014 | Tsuchida | ............ H01M 10/443 |
| | | | | 320/136 |
| 2015/0354992 | A1* | 12/2015 | Murokita | ............ G01D 5/3473 |
| | | | | 356/614 |
| 2016/0288823 | A1* | 10/2016 | Mikamo | ............ G01D 5/24461 |
| 2019/0140460 | A1* | 5/2019 | Qiu | ..................... H01M 10/425 |
| 2020/0185930 | A1 | 6/2020 | Kuwata et al. | |
| 2020/0309566 | A1* | 10/2020 | Fujita | ..................... G01L 5/221 |
| 2021/0194331 | A1* | 6/2021 | Tsai | ....................... H02K 11/33 |

FOREIGN PATENT DOCUMENTS

| | | | |
|---|---|---|---|
| JP | H02-124422 | A | 5/1990 |
| JP | H06-47239 | B | 6/1994 |
| JP | 2000-354335 | A | 12/2000 |
| JP | 2001-037094 | A | 2/2001 |
| JP | 2003-168857 | A | 6/2003 |
| JP | 2010-002267 | A | 1/2010 |
| JP | 2018-048902 | A | 3/2018 |
| JP | 2018-059875 | A | 4/2018 |
| JP | 2020-0186679 | A | 11/2020 |
| JP | 6787345 | B | 11/2020 |
| JP | 2020-204625 | A | 12/2020 |
| WO | 2008/105217 | A1 | 9/2008 |
| WO | 2011/042190 | A1 | 4/2011 |
| WO | WO-2011042190 | A1 * | 4/2011 ......... G01D 5/24447 |
| WO | 2017/126338 | A1 | 7/2017 |
| WO | 2019/156117 | A1 | 8/2019 |

OTHER PUBLICATIONS

Extended European Search Report dated Jul. 26, 2022 for EP 22167429.4 (European counterpart of this application) (8 pages).
A Notice of Reasons for Revocation dated Mar. 1, 2024, issued from the Japanese Patent Office (JPO) of Japanese Patent Application No. 2021-066627 and a Machine translation thereof (70 pages).

* cited by examiner

ENCODER, SERVO MOTOR, SERVO SYSTEM, AND ENCODER CONTROL METHOD

CROSS-REFERENCE TO RELATED APPLICATIONS

This application is based on and claims priority from Japanese Patent Application No. 2021-066627, filed on Apr. 9, 2021, with the Japan Patent Office, the disclosure of which is incorporated herein in its entirety by reference.

TECHNICAL FIELD

The present disclosure relates to an encoder, a servo motor, a servo system, and an encoder control method.

BACKGROUND

International Patent Publication No. WO 2017/126338 discloses an encoder apparatus including a position detection system which in turn includes a detecting unit that detects position information of a moving unit, an electric signal generating unit that generates an electric signal in response to the movement of the moving unit, and a battery that supplies at least a part of power consumed by the position detection system in accordance with the electric signal generated by the electric signal generating unit. The battery is accommodated in a battery housing, and held on a circuit board via electrodes and wirings.

SUMMARY

According to an aspect of the present disclosure, an encoder includes: an angular position information detector configured to detect angular position information indicating an angular position of a rotating disk within one rotation thereof; a multi-rotation information detector configured to detect multi-rotation information indicating a number of rotations of the disk; a battery configured to supply a power to the multi-rotation information detector when an external power is not supplied to the encoder; and a connector configured to connect a connection terminal of the battery to a substrate to which at least one of the angular position information detector and the multi-rotation information detector is connected, via a solder in contact with the connection terminal.

According to another aspect of the present disclosure, an encoder includes: an angular position information detector configured to detect angular position information of a rotating disk within one rotation thereof; a multi-rotation information detector configured to detect multi-rotation information indicating a number of rotations of the disk; and a battery configured to supply a power to the multi-rotation information detector when an external power is not supplied to the encoder, and having a solid electrolyte.

According to yet another aspect of the present disclosure, a servo motor includes: a motor in which a rotor rotates around a stator; and the above-described encoder configured to detect at least one of a position, speed, and acceleration of the rotator.

According to yet another aspect of the present disclosure, a servo system includes: a motor in which a rotor rotates around a stator; the above-described encoder configured to detect at least one of a position, speed, and acceleration of the rotator; and a control device configured to control the motor based on a detection result of the encoder.

According to yet another aspect of the present disclosure, an encoder control method controls an encoder including a multi-rotation information detector configured to detect multi-rotation information indicating a number of rotations of a disk, and a battery configured to supply a power to the multi-rotation information detector when an external power is not supplied. The encoder control method includes: causing a processing module to enter a sleep mode by the power from the battery when a supply of the external power is stopped; stopping the supply of the power of the battery to the multi-rotation information detector when the processing module enters the sleep mode; receiving an electric signal generated in response to a rotation of the disk, thereby causing the processing module to restore from the sleep mode; and starting the supply of the power to the multi-rotation information detector when the processing module restores from the sleep mode.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

In the conventional technology described above, since the encoder apparatus may have a problem in a case where an impact or vibration occurs in the apparatus, a higher durability is required.

The present disclosure has been made in consideration of the problem, and an object thereof is to provide an encoder, a servo motor, a servo system, and an encoder control method which are capable of improving the durability.

Hereinafter, an embodiment of the present disclosure will be described with reference to the drawings.

(1. Overall Configuration of Servo System)

Figure 1:
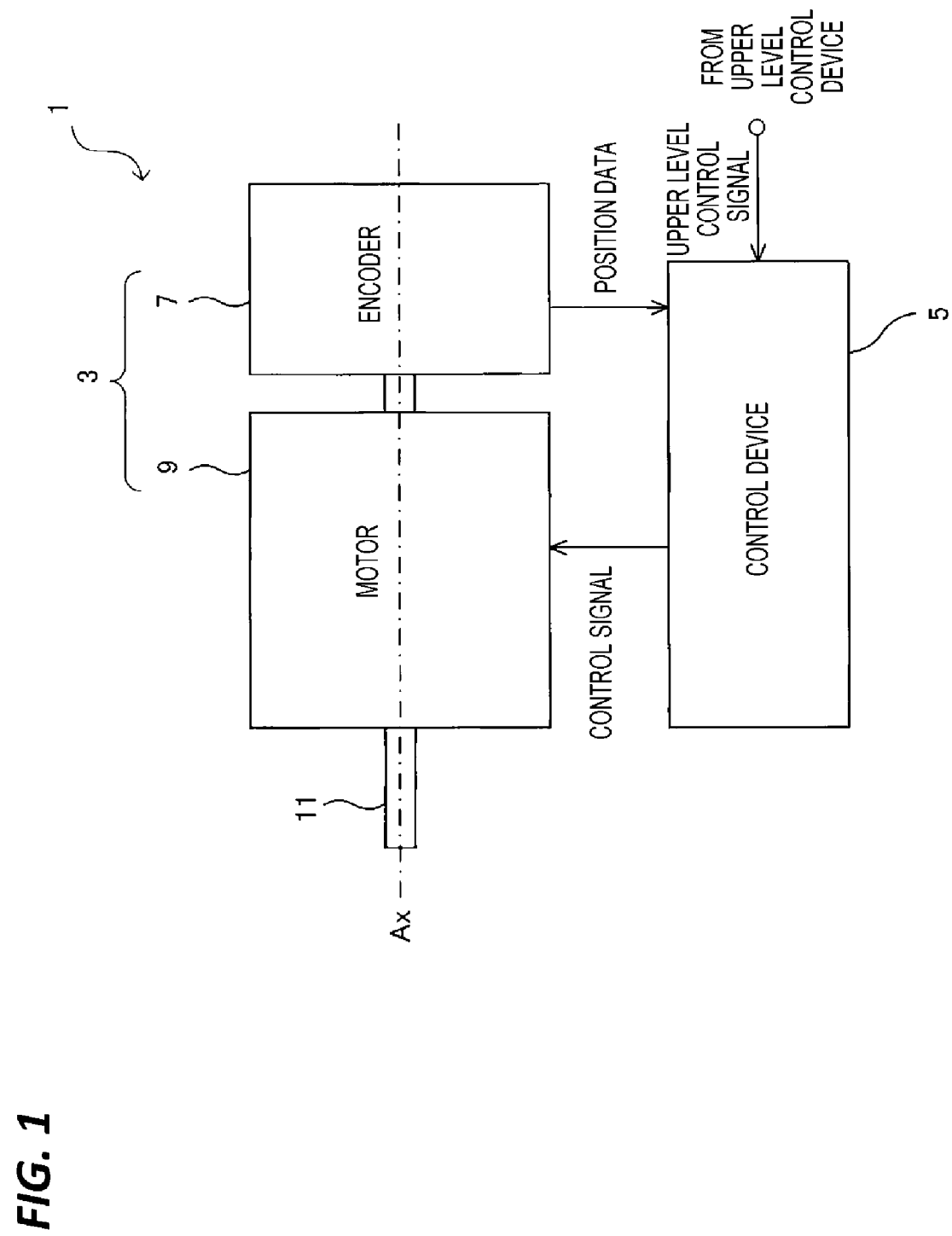
FIG. 1 is a view illustrating an example of an overall configuration of a servo system.

With reference to FIG. 1, an example of an overall configuration of a servo system according to an embodiment will be described. FIG. 1 is a view illustrating an example of the overall configuration of the servo system.

As illustrated in FIG. 1, a servo system 1 includes a servo motor 3 and a control device 5. The servo motor 3 includes an encoder 7 and a motor 9.

The motor 9 is, for example, a rotary motor in which a rotor (not illustrated) rotates around a stator (not illustrated). The motor 9 rotates a shaft 11 fixed to the rotor around a rotation axis Ax. While the motor 9 alone may be called a servo motor, the configuration including the motor 9 and the encoder 7 will be referred to as a servo motor 3 in the embodiment.

The encoder 7 is connected to, for example, the counter load side of the motor 9 (the right side in FIG. 1) opposite to the load side of the motor 9 (the side that outputs a rotational force; the left side in FIG. 1). However, the encoder 7 may well be connected to the load side of the motor 9. The encoder 7 detects at least one of angular position information indicating an angular position of the shaft 11 (rotor) of the motor 9 within one rotation thereof, and multi-rotation information indicating the number of rotations of the shaft 11, and outputs position data based on the information. The encoder 7 may detect at least one of the rotation speed and the rotational acceleration of the shaft 11, in addition to or instead of the angular position of the shaft 11.

The control device 5 controls, for example, a current or voltage applied to the motor 9 based on the position data output from the encoder 7, so as to control the rotation of the motor 9. The control device 5 controls the motor 9 to implement, for example, a position, speed, or torque indicated in an upper level control signal output from an upper level control device.

(2. Apparatus Configuration of Encoder)

Figure 2:
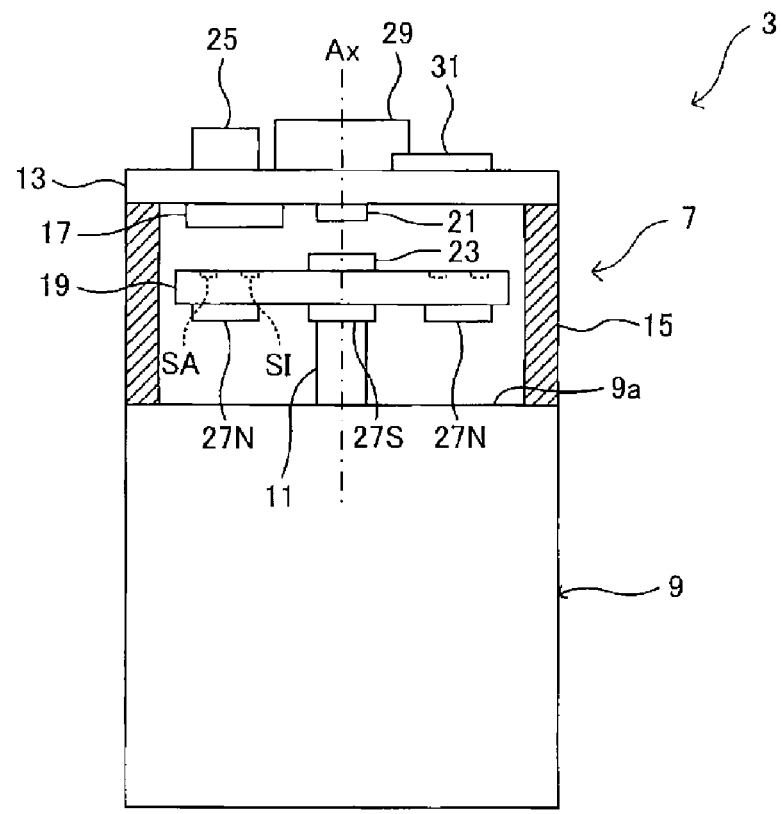
FIG. 2 is a partial cross-sectional side view illustrating an example of an apparatus configuration of an encoder.
Figure 3:
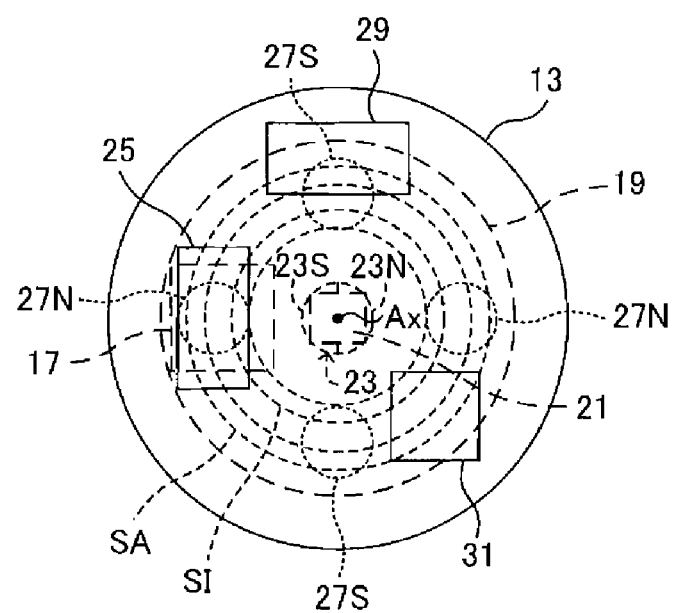
FIG. 3 is a top view illustrating the example of the apparatus configuration of the encoder when viewed from a substrate.

With reference to FIGS. 2 and 3, an example of an apparatus configuration of the encoder 7 will be described. FIG. 2 is a partial cross-sectional side view illustrating an example of the apparatus configuration of the encoder 7. FIG. 3 is a top view illustrating the example of the apparatus configuration of the encoder 7 when viewed from a substrate.

As illustrated in FIG. 2, the servo motor 3 includes the encoder 7 and the motor 9. As illustrated in FIGS. 2 and 3, the encoder 7 includes a substrate 13, a substrate support member 15, an optical module 17, a disk 19, a magnetic detecting unit 21, a magnet 23, a trigger signal generator 25, a plurality of magnets 27, a battery 29, and a processing module 31. Although not illustrated in FIGS. 2 and 3, the encoder 7 further includes connectors that connect the substrate 13 and the battery 29 to each other. Details of the connectors will be described later with reference to FIG. 4. In the embodiment illustrated in FIGS. 2 and 3, both the optical module 17 and the magnetic detecting unit 21 are connected to the substrate 13. However, any one of the optical module 17 and the magnetic detecting unit 21 may be connected to the substrate 13.

The substrate 13 may be a printed circuit board obtained by mounting printed wirings (not illustrated) or a plurality of circuit components on a board made of an insulator. The substrate 13 has a substantially disc shape. The substrate 13 is disposed opposite to the motor 9 with respect to the disk 19 in the axial direction along the rotation axis Ax. The substrate 13 is supported substantially in parallel to the disk 19 by the substrate support member 15. The substrate 13 is not limited to a single substrate, and may be configured with a plurality of substrates.

The substrate support member 15 is, for example, a cylindrical member, and fixes the substrate 13 to the end 9a of the housing of the motor 9 on the counter load side of the motor 9. The substrate support member 15 may be, for example, a plurality of columnar members.

Figure 5:
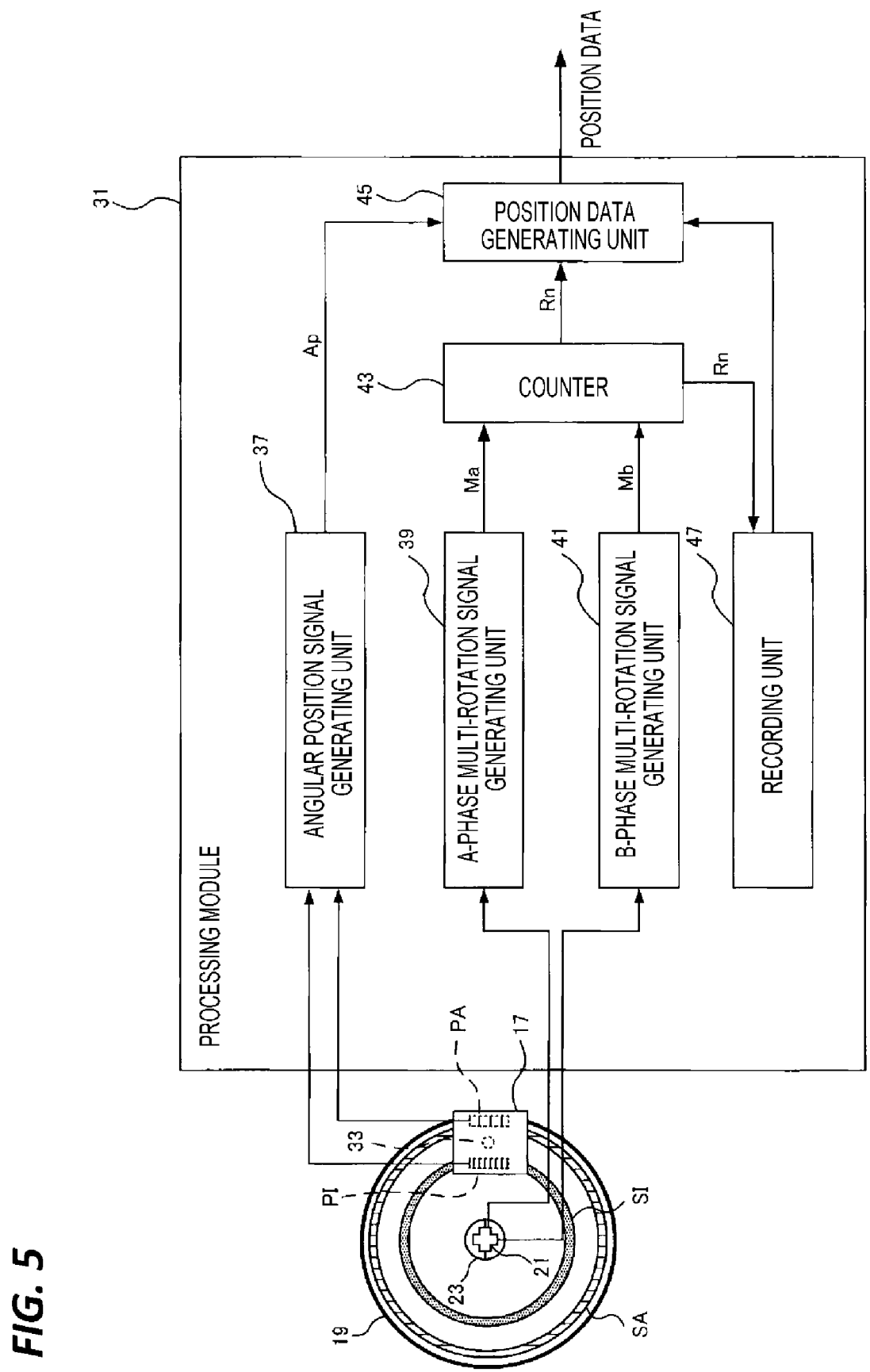
FIG. 5 is a block diagram illustrating an example of a functional configuration of a processing module.

The optical module 17 (an example of an angular position information detecting unit) detects angular position information indicating an angular position of the rotating disk 19 within one rotation thereof. The optical module 17 is provided on the surface of the substrate 13 that faces the disk 19. When an external power is supplied to the encoder 7, the power is also supplied to the optical module 17, and when the external power is not supplied to the encoder 7, the power supply to the optical module 17 is also stopped. The configuration of the optical module 17 is not particularly limited as long as the angular position information is optically detectable. For example, as illustrated in FIG. 5 to be described later, the optical module 17 may include a light source 33 and light receiving arrays PA and PI on the surface thereof facing the disk 19. The light receiving array PA receives light reflected by a slit array SA of the disk 19, and outputs an absolute signal (an example of the angular position information). The light receiving array PI receives light reflected by a slit array SI of the disk 19, and outputs an incremental signal (an example of the angular position information). The optical module 17 is a so-called reflection type optical module in which the light source 33 and the light receiving arrays PA and PI are arranged on the same side that faces the disk 19.

The disk 19 is, for example, a disc-shaped member. The disk 19 is connected to the shaft 11 of the motor 9, and rotates together with the shaft 11. The disk 19 includes the two slit arrays SA and SI on the surface thereof facing the optical module 17. Each of the slit arrays SA and SI includes a plurality of slits (not illustrated) arranged in a ring shape circumferentially around the center of the disk on the rotation axis Ax. The slits are formed in the surface of the disk 19, and are regions that perform, for example, an action of reflecting light emitted from the light source 33. The number of slit arrays formed in the disk 19 may be one or three or more as long as the absolute position of the disk 19 is detectable.

The magnetic detecting unit 21 (an example of a multi-rotation information detecting unit) detects multi-rotation information indicating the number of rotations of the disk 19. The magnetic detecting unit 21 is provided, for example, on the surface of the substrate 13 that faces the disk 19. The magnetic detecting unit 21 is disposed, for example, at the position facing the magnet 23. When an external power is supplied to the encoder 7, the power is also supplied to the magnetic detecting unit 21, and when the external power is not supplied to the encoder 7, the power supply to the magnetic detecting unit 21 is controlled by the processing module 31. The configuration of the magnetic detecting unit 21 is not particularly limited as long as the multi-rotation information of the disk 19 is magnetically detectable. As for the magnetic detecting unit 21, a magnetic resistive element such as, for example, an MR element, a GMR element, or a TMR element may be used.

The magnet 23 is disposed, for example, on the surface of the disk 19 that faces the magnetic detecting unit 21. The magnet 23 is positioned, for example, on the rotation axis Ax. The configuration of the magnet 23 is not particularly limited as long as the direction of magnetic flux detected by the magnetic detecting unit 21 is reversed every time the disk 19 rotates by about 180°. For example, as illustrated in FIG. 3, the magnet 23 may be magnetized such that the N and S poles are formed in the diameter direction of the disk 19. FIG. 3 illustrates the N pole of the magnet 23 as 23N and the S pole of the magnet 23 as 23S. The magnet 23 may have, for example, a disc shape or a ring shape. The magnetic detecting unit 21 detects the direction of magnetic flux of the magnet 23, and outputs a signal that changes by one cycle when the disk 19 rotates once, as two A-phase and B-phase signals having 90° different phases from each other (an example of the multi-rotation information).

The trigger signal generator 25 (an example of an electric signal generating unit) generates a trigger signal (an example of an electric signal) in response to the rotation of the disk 19. The trigger signal generator 25 is provided, for example, on the surface of the substrate 13 opposite to the disk 19. The configuration of the trigger signal generator 25 is not particularly limited as long as the trigger signal may be periodically generated in response to the rotation of the disk 19. For example, the trigger signal generator 25 may be configured to include a magnetic element (not illustrated) and a coil (not illustrated) that produce a large Barkhausen effect. In this case, the trigger signal generator 25 outputs the trigger signal which is, for example, a pulse signal, from the coil as a result of the large Barkhausen effect in which the magnetization direction of the magnetic element is rapidly reversed by an external magnetic field. The trigger signal generator 25 is positioned on the rotation locus of the magnets 27 when viewed from the axial direction of the rotation axis Ax.

The magnets 27 are disposed, for example, on the surface of the disk 19 opposite to the substrate 13. The configuration of the magnets 27 is not particularly limited as long as the magnetic field applied to the magnetic element of the trigger signal generator 25 is periodically reversed in response to the rotation of the disk 19. For example, as illustrated in FIG. 3, the four magnets 27 may be arranged circumferentially at intervals of about 90° such that the magnetic poles thereof close to the substrate 13 are alternately different. FIG. 3 illustrates the magnets 27 of which magnetic poles close to the substrate 13 are N and S poles, as 27N and 27S, respectively. The trigger signal generator 25 generates the trigger signal four times for each rotation of the disk 19, by the four magnets 27.

The battery 29 supplies a power to the magnetic detecting unit 21 when the external power is not supplied to the encoder 7. The battery 29 does not directly supply the power to the magnetic detecting unit 21, but supplies the power via the processing module 31. That is, the battery 29 is a supply source for supplying a power to the magnetic detecting unit 21 when the external power is not supplied to the encoder 7. The battery 29 may be a secondary battery which is usable repeatedly by being charged. The battery 29 may be, for example, an all-solid-state battery having a solid electrolyte. The embodiment describes a case where the battery 29 is the all-solid-state battery. The all-solid-state battery 29 is provided on the surface of the substrate 13 opposite to the disk 19. The all-solid-state battery 29 is electrically connected and mechanically fixed to the substrate 13 by solders.

The processing module 31 generates position data of the disk 19 based on the angular position information and the multi-rotation information, when the external power is supplied to the encoder 7. When the external power is not supplied to the encoder 7, the processing module 31 controls the switching between the power supply from the all-solid-state battery 29 to the magnetic detecting unit 21, and the stop of the power supply. The processing module 31 is provided on the surface of the substrate 13 opposite to the disk 19. The configuration of the processing module 31 is not particularly limited, but the processing module 31 may be configured as a processor having a plurality of circuit elements such as a CPU and a memory.

(3. Configuration of Connectors Between all-Solid-State Battery and Substrate)

Figure 4:
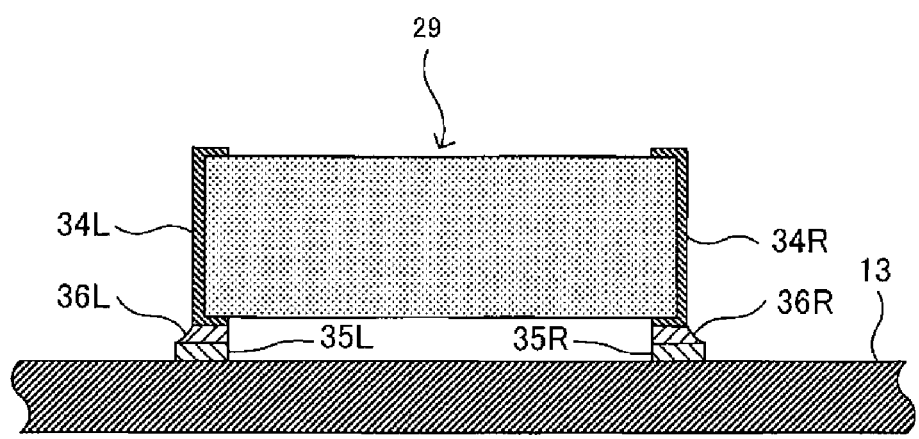
FIG. 4 is a cross-sectional view illustrating an example of a configuration of connectors that connect an all-solid-state battery and the substrate.

With reference to FIG. 4, descriptions will be made on an example of the configuration of connectors that connect the all-solid-state battery 29 and the substrate 13 to each other. FIG. 4 is a cross-sectional view illustrating an example of the configuration of the connectors that connect the all-solid-state battery 29 and the substrate 13 to each other. FIG. 4 omits the illustration of the internal structure of the all-solid-state battery 29.

As illustrated in FIG. 4, the all-solid-state battery 29 includes connection terminals 34L and 34R at both ends thereof in the direction parallel to the substrate 13. Lands 35L and 35R are formed on the surface of the substrate 13 on which the all-solid-state battery 29 is provided, to correspond to the connection terminals 34L and 34R, respectively. The lands 35L and 35R are terminals made of, for example, copper foil. A connector 36L connects the connection terminal 34L of the all-solid-state battery 29 to the land 35L via a solder in contact with the connection terminal 34L. A connector 36R connects the connection terminal 34R of the all-solid-state battery 29 to the land 35R via a solder in contact with the connection terminal 34R. The meaning of the terms "via a solder" includes a configuration where the connection terminals 34L and 34R and the substrate 13 are connected to each other by solders interposed therebetween. Thus, the description also includes, for example, a case where the connection terminals 34L and 34R are fixed to, for example, a child board by a solder, and the child board is connected to the substrate 13 by specific means (e.g., connectors). FIG. 4 illustrates a configuration where the connectors 36L and 36R directly connect the connection terminals 34L and 34R of the all-solid-state battery 29 to the substrate 13 by the solders, as an example. By the connectors 36L and 36R, the all-solid-state battery 29 is electrically connected to the wiring of the substrate 13, and mechanically fixed to the substrate 13.

(4. Functional Configuration of Processing Module)

With reference to FIG. 5, an example of a functional configuration of the processing module 31 will be described. FIG. 5 is a block diagram illustrating an example of the functional configuration of the processing module 31.

The processing module 31 generates the position data of the disk 19 based on both the angular position information and the multi-rotation information when the external power is supplied to the encoder 7, and generates a multi-rotation amount of the disk 19 based on the multi-rotation information detected by the magnetic detecting unit 21 using the power supplied from the all-solid-state battery 29 when the external power is not supplied to the encoder 7. An example of the functional configuration of the processing module 31 for implementing the above-described function will be described.

As illustrated in FIG. 5, the processing module 31 includes an angular position signal generating unit 37, an A-phase multi-rotation signal generating unit 39, a B-phase multi-rotation signal generating unit 41, a counter 43, and a position data generating unit 45, and a recording unit 47.

The angular position signal generating unit 37 specifies an absolute position of the disk 19 within one rotation thereof based on the output of the light receiving array PA. The method of specifying the absolute position is not particularly limited. For example, a plurality of light receiving elements provided in the light receiving array PA may treat each reception of light and each non-reception of light as bits based on the presence/absence of the detection of the slit array SA having an absolute pattern, to output an absolute signal having multiple bits. In this case, the angular position signal generating unit 37 specifies the absolute position by decoding the absolute position encrypted (encoded) into a serial bit pattern based on the absolute signal.

The angular position signal generating unit 37 specifies a relative position of the disk 19 within one rotation thereof based on the output of the light receiving array PI. For example, a plurality of light receiving elements provided in the light receiving array PI may output an incremental signal based on the result of the detection of the slit array SI having an incremental pattern. In this case, the angular position signal generating unit 37 specifies a position within one pitch of the incremental pattern based on the incremental signal.

The angular position signal generating unit 37 superimposes the position within one pitch specified based on the incremental signal on the absolute position specified based on the absolute signal, thereby generating an angular position signal Ap indicating a highly accurate angular position of the disk 19 within one rotation thereof (see, e.g., FIG. 9 to be described later).

The A-phase multi-rotation signal generating unit 39 converts an A-phase signal from the magnetic detecting unit 21 into a signal in a rectangular wave shape, to generate an A-phase multi-rotation signal Ma (see, e.g., FIG. 9 to be described later). As described above, since the direction of the magnetic flux of the magnet 23 is reversed every rotation angle range of about 180°, the A-phase multi-rotation signal Ma has a duty ratio of 50%, and becomes a signal of one pulse for each rotation of the disk 19.

The B-phase multi-rotation signal generating unit 41 converts a B-phase signal from the magnetic detecting unit 21 into a signal in a rectangular wave shape, to generate a B-phase multi-rotation signal Mb (see, e.g., FIG. 9 to be described later). Similarly to the A-phase multi-rotation signal Ma, the B-phase multi-rotation signal Mb has a duty ratio of 50%, and becomes a signal of one pulse for each rotation of the disk 19. The phase of the B-phase multi-rotation signal Mb is 90° different from that of the A-phase multi-rotation signal Ma.

The counter 43 executes a count arithmetic process (an example of a predetermined arithmetic process) for counting the multi-rotation amount representing the number of rotations of the disk 19 based on the A-phase multi-rotation signal Ma and the B-phase multi-rotation signal Mb, so as to generate a multi-rotation signal Rn. A specific method for the counting by the counter 43 will be described later (see FIGS. 8 and 9 to be described later). The counter 43 outputs the multi-rotation signal Rn which is the result of the count arithmetic process, to the position data generating unit 45.

The processing module 31 enters an active mode when the external power is supplied to the encoder 7. In the active mode by the external power, the processing module 31 supplies the power to the magnetic detecting unit 21. The position data generating unit 45 synthesizes the angular position signal Ap and the multi-rotation signal Rn with each other to generate position data (an example of first position data), and outputs the position data to the control device 5. The processing module 31 switches to a sleep mode when the external power is not supplied to the encoder 7. In the sleep mode, the processing module 31 stops the power supply to the magnetic detecting unit 21. In the sleep mode, the processing module 31 suspends various arithmetic processes including the generation of position data, while maintaining its started state by the power supplied from the all-solid-state battery 29 without entering a completely stopped state.

As described above, the trigger signal generator 25 generates a trigger signal in response to the rotation of the disk 19. When the trigger signal is received from the trigger signal generator 25 in the sleep mode, the processing module 31 returns to the active mode from the sleep mode by the power supplied from the all-solid-state battery 29. In the active mode by the all-solid-state battery 29, the processing module 31 supplies the power to the magnetic detecting unit 21, and acquires the A-phase signal and the B-phase signal from the magnetic detecting unit 21. The counter 43 receives the A-phase multi-rotation signal Ma from the A-phase multi-rotation signal generating unit 39 and the B-phase multi-rotation signal Mb from the B-phase multi-rotation signal generating unit 41, and executes the count arithmetic process. The counter 43 records the multi-rotation signal Rn (an example of second position data) which is the result of the count arithmetic process, in the recording unit 47. After acquiring the A-phase signal and the B-phase signal from the magnetic detecting unit 21, the processing module 31 stops the power supply from the all-solid-state battery 29 to the magnetic detecting unit 21. For example, the power supply to the magnetic detecting unit 21 may be stopped before the start of the count arithmetic process.

The recording unit 47 (an example of a nonvolatile memory) records the multi-rotation signal Rn from the counter 43. The recording unit 47 is not particularly limited as long as the recording unit 47 is a nonvolatile memory capable of reading and writing data and maintaining recorded contents even when power is OFF. As for the recording unit 47, for example, a FRAM (registered trademark) (ferroelectric memory) may be used. The recording unit 47 is equipped in the processing module 31. However, the recording unit 47 may be provided outside the processing module 31 (see, e.g., FIG. 14 to be described later).

When the state where the external power is not supplied to the encoder 7 is restored to the state where the external power is supplied, the position data generating unit 45 reads the multi-rotation signal Rn recorded in the recording unit 47, and synthesizes the read multi-rotation signal Rn with the angular position signal Ap output from the angular position signal generating unit 37, so as to generate an initial value of the position data. Then, the processing module 31 executes the normal position data generating process performed when the external power is supplied to the encoder 7.

The distribution of the above-described processes in, for example, the angular position signal generating unit 37, the A-phase multi-rotation signal generating unit 39, the B-phase multi-rotation signal generating unit 41, the counter 43, the position data generating unit 45, and the recording unit 47 is not limited to the example described above. For example, the processes may be performed by a smaller number of processing units (e.g., one processing unit) or further sub-divided processing units. In the processing module 31, only the portion that supplies the power to the magnetic detecting unit 21 may be implemented by an actual device, and the functions of the other processing units may be implemented by programs executed by a CPU 901 to be described later (see, e.g., FIG. 15). A portion or all of the functions of the respective processing units may be implemented by actual devices such as, for example, an ASIC, an FPGA or other electric circuits.

(5. Circuit Configuration of Substrate)

Figure 6:
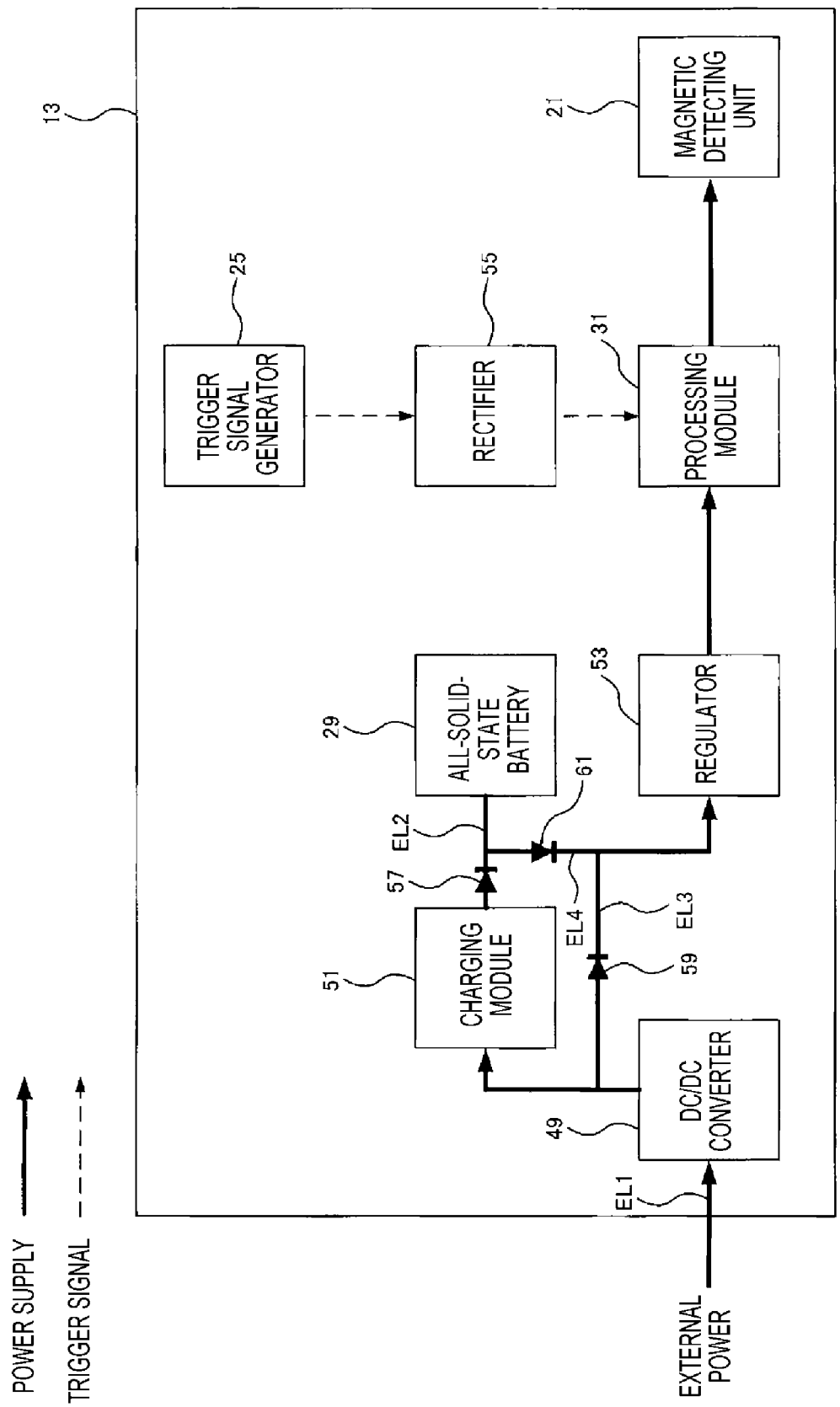
FIG. 6 is a block diagram illustrating an example of a circuit configuration of the substrate.

With reference to FIG. 6, an example of a circuit configuration of the substrate 13 will be described. FIG. 6 is a block diagram illustrating an example of the circuit configuration of the substrate 13. In FIG. 6, the solid arrow indicates the power supply line by the external power or the all-solid-state battery 29, and the dashed line arrow indicates the signal line of the trigger signal.

As illustrated in FIG. 6, the encoder 7 includes a DC/DC converter 49, a charging module 51, the all-solid-state battery 29, a regulator 53, the trigger signal generator 25, a rectifier 55, the processing module 31, the magnetic detecting unit 21, and a plurality of rectifying elements 57, 59, and 61, as the circuit configuration implemented on the substrate 13. FIG. 6 omits the illustration of the circuit configuration of the optical detection system including the optical module 17.

The DC/DC converter 49 converts, for example, the voltage of the external power which is a DC power source, into a predetermined voltage, and outputs the converted voltage to the charging module 51 and the regulator 53.

The charging module 51 controls the charging of the all-solid-state battery 29 which is a secondary battery. The charging module 51 charges the all-solid-state battery 29 when the external power is supplied to the encoder 7, and stops the charging of the all-solid-state battery 29 when the external power is not supplied to the encoder 7. The method of charging the all-solid-state battery 29 is not particularly limited. The charging module 51 is connected to a power supply line EL1 of the external power to be electrically parallel with the processing module 31.

The rectifying element 57 is electrically connected to a power supply line EL2 between the charging module 51 and the all-solid-state battery 29. The rectifying element 57 regulates the current direction to the direction from the charging module 51 toward the all-solid-state battery 29. The rectifying element 59 is electrically connected to a power supply line EL3 between the DC/DC converter 49 and the regulator 53. The rectifying element 59 regulates the current direction to the direction from the DC/DC converter 49 toward the regulator 53. The rectifying element 61 is electrically connected to a power supply line EL4 between the all-solid-state battery 29 and the regulator 53. The rectifying element 61 regulates the current direction to the direction from the all-solid-state battery 29 toward the regulator 53. The rectifying elements 57, 59, and 61 are not particularly limited as long as the current direction may be regulated. As for the rectifying elements 57, 59, and 61, for example, transistors or diodes may be used.

When the external power is not supplied to the encoder 7, the all-solid-state battery 29 outputs a power to the regulator 53 through the power supply line EL4.

The regulator 53 controls the voltage and current of the power output from the DC/DC converter 49 or the all-solid-state battery 29 to be kept constant, and outputs the power to the processing module 31.

The processing module 31 controls the power supply to the magnetic detecting unit 21. When the external power is supplied to the encoder 7, the processing module 31 supplies the power to the magnetic detecting unit 21. When the external power is not supplied to the encoder 7, the processing module 31 stops the power supply to the magnetic detecting unit 21. In this case, as described above, the processing module 31 switches to the sleep mode by the power supplied from the all-solid-state battery 29.

The trigger signal generator 25 generates the trigger signal in response to the rotation of the disk 19. The rectifier 55 rectifies the current of the trigger signal, and restricts the current and voltage of the trigger signal to be equal to or less than a predetermined value. The rectifier 55 outputs the rectified and restricted trigger signal to the processing module 31.

As described above, when the trigger signal is received in the sleep mode, the processing module 31 supplies the power from the all-solid-state battery 29 which serves as a power supply source, to the magnetic detecting unit 21. After acquiring the A-phase signal and the B-phase signal from the magnetic detecting unit 21, the processing module 31 stops the power supply to the magnetic detecting unit 21. The processing module 31 executes the count arithmetic process based on the A-phase signal and the B-phase signal, and switches to the sleep mode after the arithmetic process is completed. The processing module 31 repeats the same process each time the trigger signal is received in the sleep mode.

(6. Trigger Signal, Process by Processing Module, and Timing of Turn-ON of Magnetic Detecting Unit)

Figure 7:
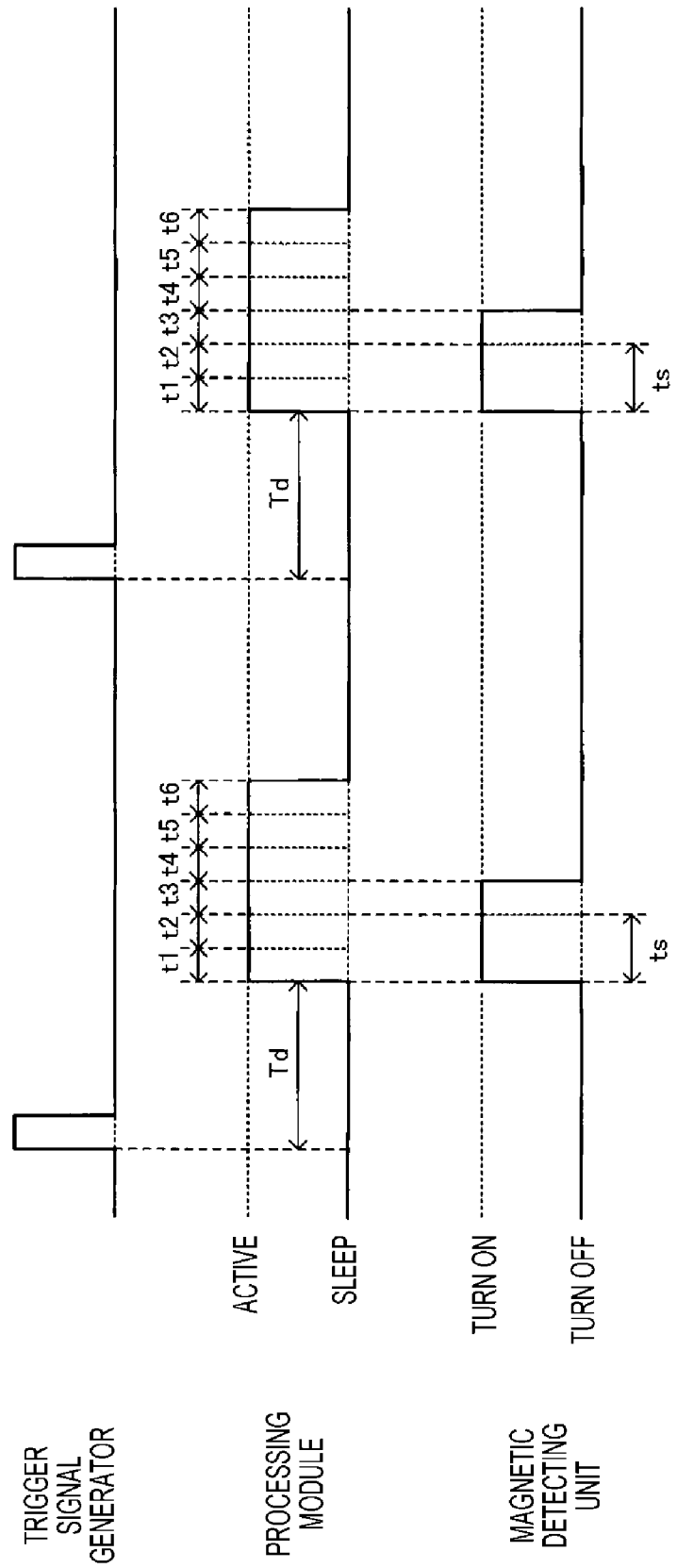
FIG. 7 is a timing chart illustrating an example of a trigger signal, each process executed by the processing module, and a timing of power-ON of a magnetic detecting unit.

With reference to FIG. 7, an example of the trigger signal, each process executed by the processing module, and a timing of turn-ON of the magnetic detecting unit will be described. FIG. 7 is a timing chart illustrating an example of the trigger signal, each process executed by the processing module, and the timing of turn-ON of the magnetic detecting unit.

As illustrated in FIG. 7, when the trigger signal generator 25 generates the trigger signal, the processing module 31 switches from the sleep mode to the active mode. A time Td required from the generation of the trigger signal until the switching to the active mode is relatively short, as compared with a case where the processing module 31 is stopped instead of entering the sleep mode (see, e.g., FIG. 13 to be described later), because the process of starting the processing module 31 becomes unnecessary. The processing module 31 starts the power supply to the magnetic detecting unit 21 substantially at the same time as the switching to the active mode, so as to turn ON the magnetic detecting unit 21.

When the processing module 31 switches to the active mode by the trigger signal, the processing module 31 executes a plurality of processes. For example, the processing module 31 executes a process of acquiring a clock signal during the time t1, and executes a process of confirming a port for communicating with, for example, the magnetic detecting unit 21 during the time t2. The magnetic detecting unit 21 stabilizes the output of the A-phase signal and the B-phase signal during the time is which is substantially the same as the sum of the times t1 and t2. During the time t3 after the signals are stabilized by the magnetic detecting unit 21, the processing module 31 executes a process of acquiring the A-phase signal and the B-phase signal from the magnetic detecting unit 21. After the elapse of the time t3, that is, after the acquisition of the A-phase signal and the B-phase signal from the magnetic detecting unit 21 is completed, the processing module 31 stops the power supply to the magnetic detecting unit 21 to turn OFF the magnetic detecting unit 21.

After stopping the power supply to the magnetic detecting unit 21, the processing module 31 executes predetermined arithmetic processes. For example, during the time t4, the processing module 31 executes a process of reading the multi-rotation amount (the multi-rotation signal Rn) of the disk 19 recorded in the recording unit 47. During the time t5, the processing module 31 executes the count arithmetic process for counting the multi-rotation amount of the disk 19 based on the A-phase signal and the B-phase signal acquired from the magnetic detecting unit 21. During the time 6, the processing module 31 executes a process of updating the multi-rotation amount read from the recording unit 47 based on the result of the count arithmetic process. These processes are examples of the predetermined arithmetic processes. When the predetermined arithmetic processes are completed, the processing module 31 switches from the active mode to the sleep mode.

In the example illustrated in FIG. 7, the processing module 31 stops the power supply to the magnetic detecting unit 21 between the times t3 and t4, that is, after the acquisition of the A-phase signal and the B-phase signal from the magnetic detecting unit 21 and before the start of the predetermined arithmetic processes. However, the timing for stopping the power supply is not limited thereto. For example, the processing module 31 may stop the power supply to the magnetic detecting unit 21 during the execution of the predetermined arithmetic processes, for example, between the times t4 and t5, between the times t5 and t6, or during any one of the times t4, t5, and t6. For example, the processing module 31 may stop the power supply to the magnetic detecting unit 21 substantially at the same time as the switching from the active mode to the sleep mode.

(7. Process Procedure by Processing Module)

Figure 8:
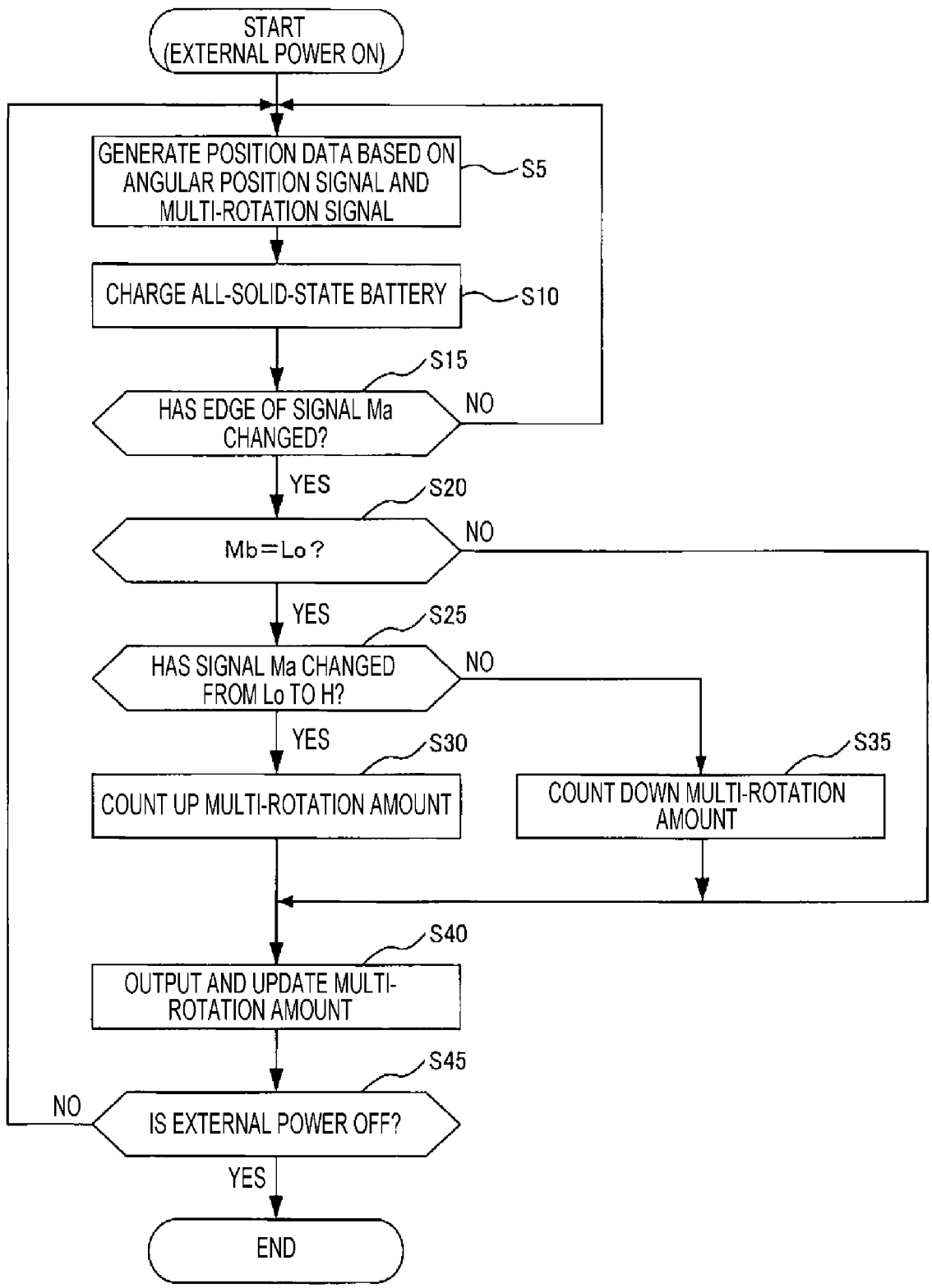
FIG. 8 is a flowchart illustrating an example of a process procedure executed by the processing module when an external power is supplied to the encoder.
Figure 9:
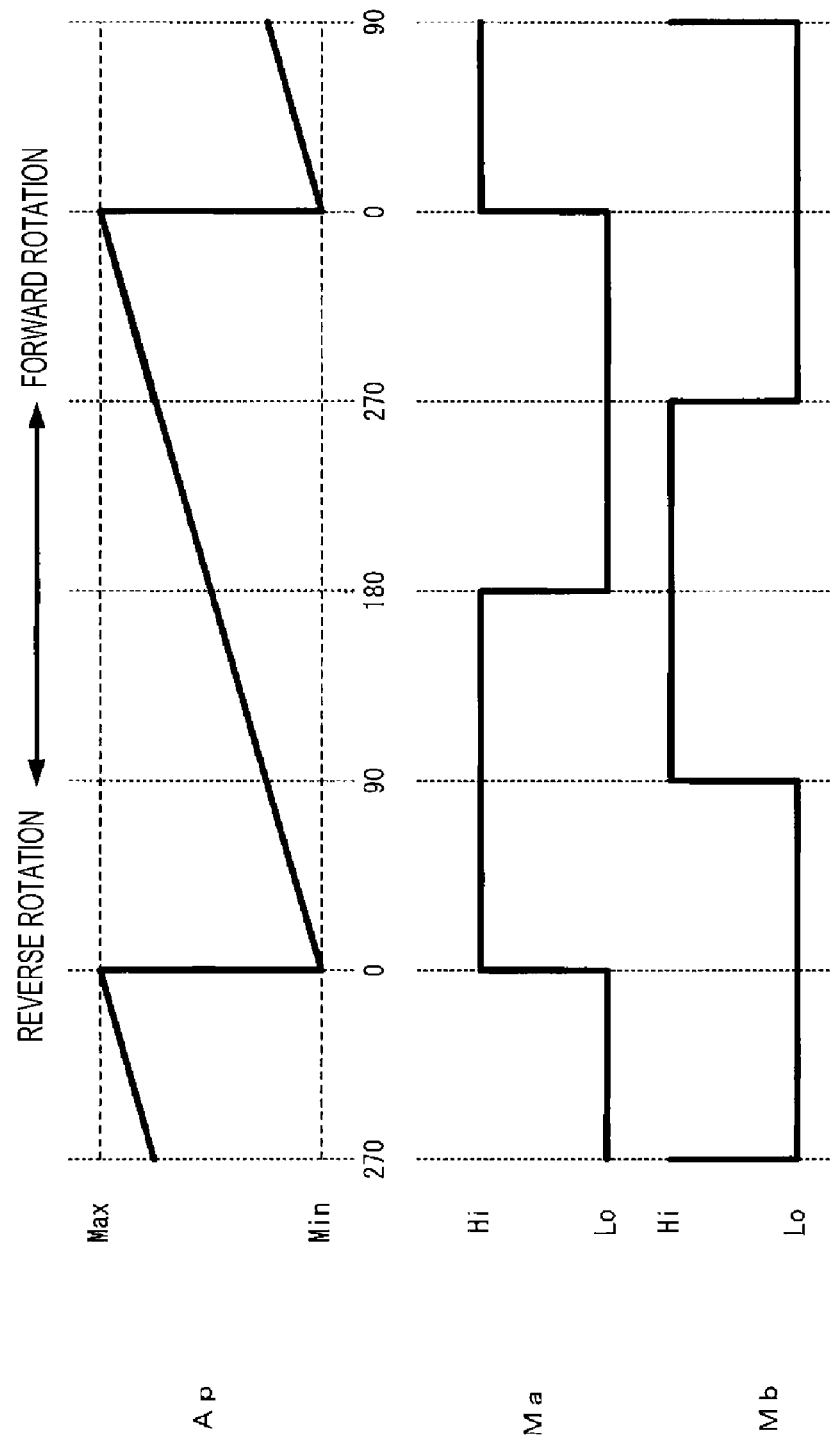
FIG. 9 is a view illustrating an example of waveforms of an angular position signal, an A-phase multi-rotation signal, and a B-phase multi-rotation signal.
Figure 10:
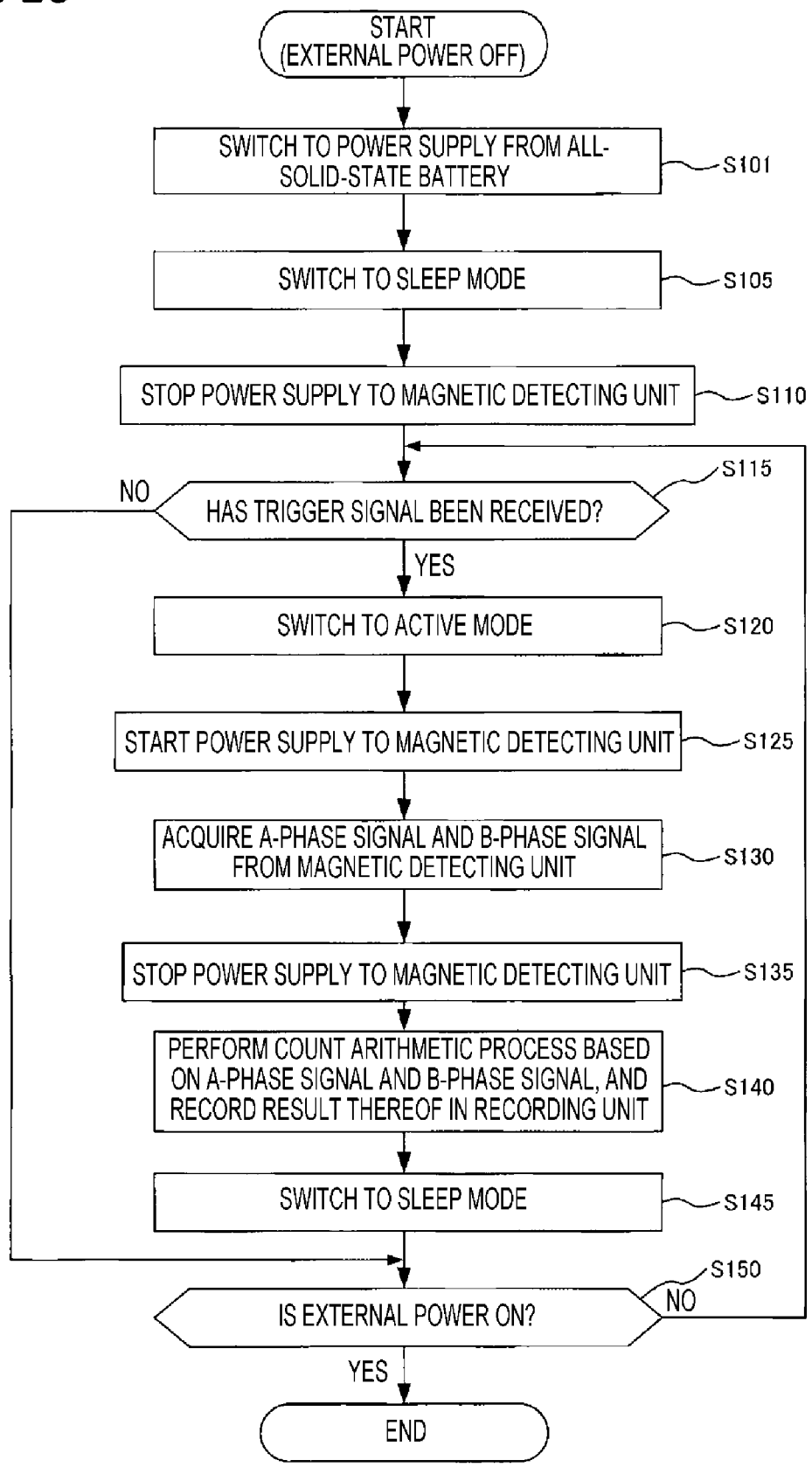
FIG. 10 is a flowchart illustrating an example of a process procedure executed by the processing module when the external power is not supplied to the encoder.

With reference to FIGS. 8 to 10, an example of the process procedure executed by the processing module 31 will be described. FIG. 8 is a flowchart illustrating an example of the process procedure executed by the processing module 31 when the external power is supplied to the encoder 7. FIG. 9 is a view illustrating an example of waveforms of the angular position signal Ap, the A-phase multi-rotation signal Ma, and the B-phase multi-rotation signal Mb. FIG. 10 is a flowchart illustrating an example of the process procedure executed by the processing module 31 when the external power is not supplied to the encoder 7.

The processing module 31 executes the process procedure illustrated in the flowchart of FIG. 8 when the external power is supplied to the encoder 7. As illustrated in FIG. 8, in step S5, the processing module 31 generates the position data by the position data generating unit 45, based on the angular position signal Ap output from the angular position signal generating unit 37 and the multi-rotation signal Rn output from the counter 43. As illustrated in FIG. 9, when the disk 19 rotates in the forward rotation direction, the angular position signal Ap increases proportionally from the minimum value Min as the rotation angle approaches 360° from 0°, and when the rotation angle reaches 360° (0°), the angular position signal Ap is reset from the maximum value Max to the minimum value Min. When the disk 19 rotates in the reverse rotation direction, the angular position signal Ap decreases proportionally from the maximum value Max as the rotation angle approaches 0° from 360°, and when the rotation angle reaches 0° (360°), the angular position signal Ap is reset from the minimum value Min to the maximum value Max. As described above, the multi-rotation signal Rn indicates the multi-rotation amount of the disk 19 counted based on the A-phase multi-rotation signal Ma and the B-phase multi-rotation signal Mb.

In step S10, the processing module 31 charges the all-solid-state battery 29 by the charging module 51.

In step S15, the processing module 31 determines whether the edge of the A-phase multi-rotation signal Ma has changed, by the counter 43. As illustrated in FIG. 9, for example, the A-phase multi-rotation signal Ma becomes high (Hi) when the rotation angle of the disk 19 is in the range of 0° to 180°, and becomes low (Hi) in the range of 180° to 360° (0°). For example, the B-phase multi-rotation signal Mb becomes high (Hi) when the rotation angle of the disk 19 is in the range of 90° to 270°, and becomes low (Lo) in the range of 270° to 90°. The angular position at which the edge of the A-phase multi-rotation signal Ma changes is either 0° (360°) or 180°. When it is determined that the edge of the A-phase multi-rotation signal Ma has not changed (step S15: NO), the process returns to step S5. When it is determined that the edge of the A-phase multi-rotation signal Ma has changed (step S15: YES), the process proceeds to step S20.

In step S20, the processing module 31 determines whether the B-phase multi-rotation signal Mb is low (Lo), by the counter 43. As illustrated in FIG. 9, the angular position at which the edge of the A-phase multi-rotation signal Ma changes, and the B-phase multi-rotation signal Mb is low (Lo) is 0° (360°). The angular position at which the edge of the A-phase multi-rotation signal Ma changes, and the B-phase multi-rotation signal Mb is high (Hi) is 180°. When it is determined that the B-phase multi-rotation signal Mb is high (Hi) (step S20: NO), the process proceeds to step S40 to be described later. When it is determined that the B-phase multi-rotation signal Mb is low (Lo) (step S20: YES), the process proceeds to step S25.

In step S25, the processing module 31 refers to the A-phase multi-rotation signal Ma recorded in the recording unit 47 to determine whether the A-phase multi-rotation signal Ma has changed from low (Lo) to high (Hi), by the counter 43. As illustrated in FIG. 9, when the A-phase multi-rotation signal Ma changes from low (Lo) to high (Hi) at the angular position of 0° (360°), it indicates that the disk 19 has rotated once in the forward rotation direction. When it is determined that the A-phase multi-rotation signal Ma has changed from low (Lo) to high (Hi) (step S25: YES), the process proceeds to step S30.

In step S30, the processing module 31 reads and counts up the multi-rotation amount recorded in the recording unit 47, by the counter 43.

When it is determined in step S25 that the A-phase multi-rotation signal Ma has not changed from low (Lo) to high (Hi), that is, when the A-phase multi-rotation signal Ma has changed from high (Hi) to low (Lo) (step S25: NO), the process proceeds to step S35. As illustrated in FIG. 9, when the A-phase multi-rotation signal Ma changes from high (Hi) to low (Lo) at the angular position of 0° (360°), it indicates that the disk 19 has rotated once in the reverse rotation direction.

In step S35, the processing module 31 reads and counts down the multi-rotation amount recorded in the recording unit 47, by the counter 43.

In step S40, the processing module 31 outputs the multi-rotation amount (the multi-rotation signal Rn) counted up or down in step S30 or S35, by the counter 43, to the position data generating unit 45. The counter 43 records whether the A-phase multi-rotation signal Ma is low (Lo) or high (Hi) at the time when the counting is performed, in the recording unit 47. The counter 43 may record the multi-rotation signal Rn in the recording unit 47.

In step S45, the processing module 31 determines whether the external power is no longer supplied to the encoder 7. When it is determined that the external power is supplied to the encoder 7 (step S45: NO), the process returns to previous step S5 to repeat the same procedure. When it is determined that the external power is no longer supplied to the encoder 7 due to, for example, an occurrence of power outage (step S45: YES), the flowchart ends.

The above-described process procedure is an example, and at least a part of the procedure may be deleted or changed, or a procedure other than the above-described procedure may be added. The order of at least a part of the above-described procedure may be changed, or a plurality of procedures may be combined into a single procedure. For example, steps S5 and S10 may not be performed in the order described above, and may be performed in the reverse order or simultaneously in parallel with each other.

The processing module 31 executes the flowchart illustrated in FIG. 10 when the external power is no longer supplied to the encoder 7 due to, for example, a power outage. As illustrated in FIG. 10, in step S101, the power supply from the all-solid-state battery 29 is performed. In step S105, the processing module 31 switches to the sleep mode from the active mode by the external power.

In step S110, the processing module 31 stops the power supply to the magnetic detecting unit 21.

In step S115, the processing module 31 determines whether the trigger signal generated by the trigger signal generator 25 in response to the rotation of the disk 19 has been received via the rectifier 55. When it is determined that the trigger signal has not been received (step S115: NO), the process proceeds to step S150 to be described later. When it is determined that the trigger signal has been received (step S115: YES), the process proceeds to step S120.

In step S120, the processing module 31 switches from the sleep mode to the active mode.

In step S125, the processing module 31 starts the power supply to the magnetic detecting unit 21.

In step S130, the processing module 31 acquires the A-phase signal and the B-phase signal from the magnetic detecting unit 21, by the A-phase multi-rotation signal generating unit 39 and the B-phase multi-rotation signal generating unit 41.

In step S135, the processing module 31 stops the power supply to the magnetic detecting unit 21.

In step S140, the processing module 31 generates the A-phase multi-rotation signal Ma and the B-phase multi-rotation signal Mb based on the A-phase signal and the B-phase signal acquired from the magnetic detecting unit 21 in step S130, by the A-phase multi-rotation signal generating unit 39 and the B-phase multi-rotation signal generating unit 41. The processing module 31 executes the count arithmetic process by the counter 43 based on the A-phase multi-rotation signal Ma and the B-phase multi-rotation signal Mb, and records the multi-rotation signal Rn which is the result of the arithmetic process, in the recording unit 47.

In step S145, the processing module 31 switches from the active mode to the sleep mode.

In step S150, the processing module 31 determines whether the external power is to be supplied to the encoder 7. When it is determined that the external power is not to be supplied to the encoder 7 (step S150: NO), the process returns to previous step S115 to repeat the same procedure. When it is determined that the external power is to be supplied to the encoder 7 due to, for example, the recovery of power outage (step S150: YES), the flowchart ends.

The foregoing process procedure is an example, and at least a part of the procedure may be deleted or changed, or a procedure other than the above-described procedure may be added. The order of at least a part of the above-described procedure may be changed, or a plurality of procedures may be combined into a single procedure.

(8. Effects of Embodiment)

As described above, the encoder 7 of the embodiment includes the optical module 17 that detects the angular position information indicating the angular position of the rotating disk 19 within one rotation thereof, the magnetic detecting unit 21 that detects the multi-rotation information indicating the number of rotations of the disk 19, the battery 29 that supplies a power to the magnetic detecting unit 21 when the external power is not supplied to the encoder 7, and the connectors 36L and 36R that connect the connection terminals 34L and 34R of the battery 29 to the substrate 13 to which at least one of the optical module 17 and the magnetic detecting unit 21 is connected, via solders in contact with the connection terminals 34L and 34R.

By the solders that electrically connect the battery 29 to the substrate 13, the battery 29 is not only electrically connected to the substrate 13, but also firmly fixed to the substrate 13. That is, the connection of the connection terminals 34L and 34R by the solders implements not only the electrical connection but also the fixing of the battery 29. As a result, for example, even in a case where an impact or vibration occurs in the encoder 7, a poor connection of the substrate 13 to the wiring (the lands 35L and 35R) or a detachment of the battery 29 from the substrate 13 may be suppressed, and the durability may be improved.

In the embodiment, the connectors 36L and 36R may directly connect the connection terminals 34L and 34R of the battery 29 to the substrate 13 by the solders. In this case, since the electrical connection and the fixing are implemented only through the connection terminals 34L and 34R of the battery 29, for example, the housing for accommodating the battery 29 or lead wires become unnecessary, so that the encoder 7 may be downsized, and the number of parts may be reduced. Accordingly, this embodiment is further advantageous in terms of the ease of manufacture and the cost reduction.

In the embodiment, the battery 29 may be a secondary battery that is usable repeatedly by be charged.

In a case where a primary battery is provided as the battery 29, the power supply from the battery 29 becomes impossible when the battery capacity is used up. Further, when the battery 29 is fixed to the substrate 13 with solders, the battery 29 may not be replaced, so that the encoder 7 needs to be replaced or discarded. In the embodiment, the secondary battery is provided so that the battery may be used repeatedly by being charged. Thus, even though the battery 29 is fixed to the substrate 13 with solders, the encoder 7 may be used for an extended period of time without being replaced or discarded.

In the embodiment, the battery 29 may be an all-solid-state battery having a solid electrolyte.

In a case where a lithium-ion battery is provided as the secondary battery, the operation of the battery may become unstable under a high temperature environment, and further, a heat generation or combustion may occur, which may require a protection circuit using a thermistor. Meanwhile, the all-solid-state battery may be used under the high temperature condition, reduces the amount of heat generation thereby lowering the risk of combustion due to its solid electrolyte, has a relatively long life due to its property of low self-discharge, and has the property of relatively slow performance deterioration. Thus, by providing the all-solid-state battery, it is possible to implement the encoder 7 that is usable safely even under the high temperature environment, does not require the protection circuit, reduces the power consumption, and has the relatively long life.

In the embodiment, the encoder 7 may include the charging module 51 that charges the all-solid-state battery 29 when the external power is supplied, and stops the charging of the all-solid-state battery 29 when the external power is not supplied.

In this case, since the all-solid-state battery 29 may be charged in advance when the external power is supplied, the power supply from the all-solid-state battery 29 may be performed readily at any time when the external power is not supplied due to, for example, a power outage.

In the embodiment, the encoder 7 may include the rectifying element 57 that is electrically connected between the charging module 51 and the all-solid-state battery 29 to regulate the current direction to the direction from the charging module 51 toward the all-solid-state battery 29. In this case, when the all-solid-state battery 29 supplies a power to the magnetic detecting unit 21 via the processing module 31, the backflow of current toward the charging module 51 may be prevented.

In the embodiment, the encoder 7 may include the processing module 31 that generates the position data of the disk 19 based on at least one of the angular position information and the multi-rotation information when the external power is supplied. In that case, the charging module 51 and the processing module 31 may be connected to the power supply line EL1 of the external power, to be electrically parallel with each other.

In this case, when the external power is supplied by, for example, the recovery of power outage, the power may be promptly supplied to both the charging module 51 and the processing module 31 to immediately start the modules or immediately cause the modules to execute processes, as compared with a case where the charging module 51 and the processing module 31 are connected in series to the power supply line ELL In the embodiment, the encoder 7 may include the processing module 31 that controls the switching between the power supply from the all-solid-state batter 29 to the magnetic detecting unit 21 and the stop of the power supply.

This configuration does not indicate that the power is supplied from the all-solid-state battery 29 to the magnetic detecting unit 21 or the power supply is stopped, simply depending on, for example, whether the external power is supplied. The processing module 31 may control the power supply from the all-solid-state battery 29 to the magnetic detecting unit 21. As a result, the power supply may be controlled based on, for example, the results of the predetermined arithmetic processes by the processing module 31, and, for example, the power consumption may be suppressed.

In the embodiment, the all-solid-state battery 29 may supply the power to the magnetic detecting unit 21 via the processing module 31 when the supply of external power to the encoder 7 is stopped.

In this case, when the supply of external power is stopped, a power is not directly supplied from the all-solid-state battery 29 to the magnetic detecting unit 21, but the power may be supplied from the all-solid-state battery 29 to the magnetic detecting unit 21 via the processing module 31. As a result, the processing module 31 may control the power supply, such as supplying the power to the magnetic detecting unit 21 only during, for example, the acquisition of multi-rotation information, so that the power consumption may be further suppressed.

In the embodiment, when the supply of external power to the encoder 7 is stopped, the processing module 31 may sleep by the power from the all-solid-state battery 29.

In this case, since the started state of the processing module 31 is maintained even when the external power is not supplied to the encoder 7, the processing module 31 may immediately enter the active mode as necessary to execute the predetermined processes. As a result, the time necessary for starting the processing module 31 may be omitted, the time until the start of processes may be reduced, and the power consumption required for starting the processing module 31 may be reduced. Further, in a case where the predetermined processes (e.g., an abnormality detecting process for the all-solid-state battery 29) are executed when the external power is restored, the processes may be executed quickly.

In the embodiment, the encoder 7 may include the trigger signal generating unit 25 that generates the trigger signal in response to the rotation of the disk 19, and in that case, the processing module 31 may receive the trigger signal to be restored from the sleep mode and start the power supply to the magnetic detecting unit 21.

In this case, when the external power is not supplied, the power supply from the all-solid-state battery 29 to the magnetic detecting unit 21 may be stopped, and the power may be supplied to the magnetic detecting unit 21 only in a case where the disk 19 rotates, so as to detect the multi-rotation information. As a result, the power consumption of the all-solid-state battery 29 may be suppressed, and the life of the battery may be extended.

In the embodiment, the processing module 31 may execute the predetermined arithmetic processes based on the multi-rotation information detected by the magnetic detecting unit 21.

In this case, the processing module 31 may not only accumulate the multi-rotation information from the magnetic detecting unit 21, but also perform the arithmetic processes based on the multi-rotation information. Accordingly, the storage area of the processing module 31 may be saved, and the arithmetic operation related to the multi-rotation amount (e.g., the count arithmetic process) may be executed at the time when the multi-rotation information is detected, so that the reliability may be improved. Especially, when the battery 29 is an all-solid-state battery, processes such as, for example, checking the soundness of the all-solid-state battery may be executed so that the reliability of the entire encoder may be improved. Further, when the processing module 31 becomes active from the sleep state, the processes may be executed quickly, the power consumption of the all-solid-state battery 29 may be suppressed, and the life of the battery may be extended.

In the embodiment, the processing module 31 may stop the power supply from the all-solid-state battery 29 to the magnetic detecting unit 21, after the acquisition of the multi-rotation information from the magnetic detecting unit 21 and before the start of the predetermined arithmetic processes.

In this case, when the supply of external power is stopped, the processing module 31 may supply a power to the magnetic detecting unit 21 only in a case where the disk 19 rotates, so as to acquire the multi-rotation information, and may stop the power supply to the magnetic detecting unit 21 before starting the necessary arithmetic processes based on the acquired multi-rotation information. In this way, the processing module 31 separately controls the arithmetic processes and the stop of the power supply, so that even when the arithmetic processes require significant time, the power supply may be stopped earlier than the start of the processes, and thus, the power consumption of the all-solid-state battery 29 may be further suppressed.

In the embodiment, the encoder 7 may include the recording unit 47 which is a nonvolatile memory capable of reading and writing a data and maintaining the recorded contents even when power is OFF. In that case, the processing module 31 may record the results of the predetermined arithmetic processes in the recording unit 47.

In this case, when the supply of external power is stopped, the results of the predetermined arithmetic processes based on the multi-rotation information detected by the magnetic detecting unit 21 may be maintained even after the power supply to the magnetic detecting unit 21 is stopped. Further, when the processing module 31 is equipped with the recording unit 47 therein, the high-speed writing of data is possible, so that the power consumption of the battery may be further suppressed.

In the embodiment, the processing module 31 may be provided on the substrate 13, and may execute the generation of the position data of the disk 19 based on at least one of the angular position information and the multi-rotation information when the external power is supplied, and the generation of the multi-rotation signal Rn indicating the multi-rotation amount of the disk 19 based on the multi-rotation information detected by the magnetic detecting unit 21 using the power supplied from the all-solid-state battery 29 when the external power is not supplied.

In this case, the processing module 31 may be configured as a common component mounted on the substrate 13. As a result, the switching of control at the time when the external power is ON/OFF may be quickly performed. For example, even when a momentary power outage occurs, the switching of control may be quickly performed so that the process for the case where the external power is OFF may be restored to the process for the case where the external power is ON. Further, in a case where the predetermined arithmetic processes are executed when the external power is restored, the processes may also be quickly executed.

The encoder 7 of the embodiment includes the optical module 17 that detects the angular position information indicating the angular position of the rotating disk 19 within one rotation thereof, the magnetic detecting unit 21 that detects the multi-rotation information indicating the number of rotations of the disk 19, and the all-solid-state battery 29 that has a solid electrolyte and supplies a power to the magnetic detecting unit 21 when the external power is not supplied to the encoder 7.

With the encoder 7 that includes the all-solid-state battery 29, and thus, may store the multi-rotation information by the power supplied from the battery when the supply of external power is stopped, it is possible to implement the encoder 7 that is usable safely even under the high temperature environment, does not require the protection circuit, reduces the power consumption, and has the relatively long life.

(9. Modifications)

The embodiment is not limited to that described above, and various modifications may be made within the range that does not deviate from the gist and the technical idea of the present disclosure. Hereinafter, the modifications will be described.

(9-1. In a Case where a Detection of Abnormality of all-Solid-State Battery is Executed when the External Power is Restored)

Figure 11:
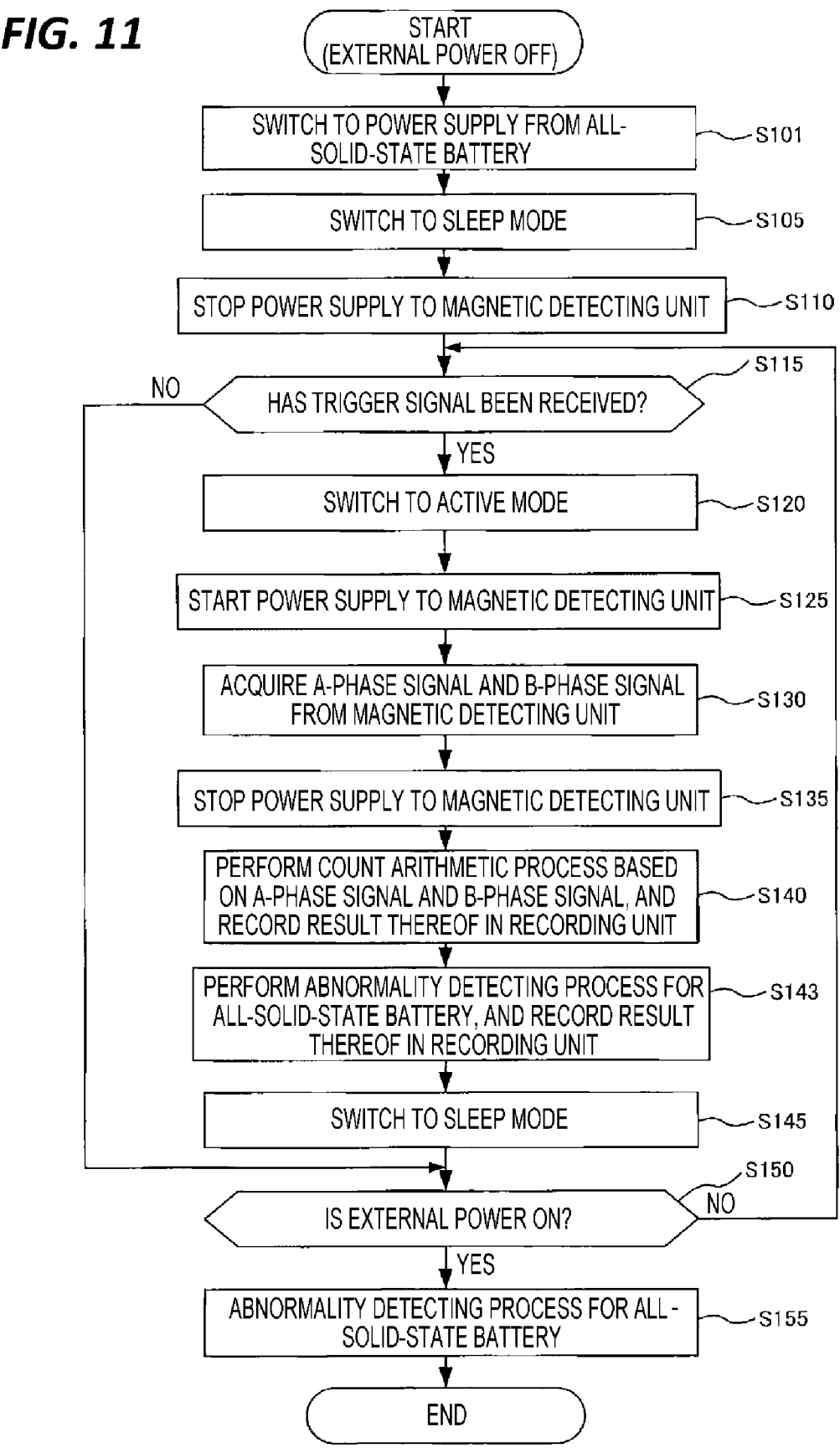
FIG. 11 is a flowchart illustrating an example of a process procedure executed by the processing module in a modification where a detection of abnormality of the all-solid-state battery is performed when the external power is restored.

When the state where the external power is not supplied to the encoder 7 is restored to the state where the external power is supplied, a process of detecting an abnormality of the all-solid-state battery 29 may be executed. With reference to FIG. 11, an example of the process procedure executed by the processing module 31 in the present modification will be described.

Since steps S105 to S140 in FIG. 11 are the same as those in FIG. 10 described above, descriptions thereof will be omitted.

In step S143, the processing module 31 executes the process of detecting an abnormality of the all-solid-state battery 29. The method of detecting an abnormality of the all-solid-state battery 29 is not particularly limited. For example, the voltage of the all-solid-state battery 29 may be detected, such that when the voltage value falls within a predetermined range, the all-solid-state battery 29 may be determined to be normal, and when the voltage value does not fall within the predetermined range, the all-solid-state battery 29 may be determined to be abnormal. The processing module 31 records the result of the abnormality detecting process in the recording unit 47. The processing module 31 may execute the process of step S143 together with, for example, the count arithmetic process during the time t5 of the time chart illustrated in FIG. 7 described above.

Steps S145 and S150 are the same as those in FIG. 10 described above. However, when it is determined in step S150 that the external power is to be supplied to the encoder 7 (step S150: YES), the process proceeds to step S155.

In step S155, the processing module 31 executes the process of detecting an abnormality of the all-solid-state battery 29. For example, as in step S143, the voltage of the all-solid-state battery 29 may be detected, such that when the voltage value falls within a predetermined range, the all-solid-state battery 29 may be determined to be normal, and when the voltage value does not fall within the predetermined range, the all-solid-state battery 29 may be determined to be abnormal. For example, the processing module 31 may refer to the information recorded in the recording unit 47 in step S143 when the supply of external power is stopped, such that when there is no information indicating that an abnormality has been detected (e.g., an alarm code), the all-solid-state battery 29 may be determined to be normal, and when there is information indicating that an abnormality has been detected, the all-solid-state battery 29 may be determined to be abnormal. The processing module 31 may output the result of the abnormality detecting process to, for example, the control device 5. Then, the flowchart ends.

When the normality or abnormality of the all-solid-state battery 29 is determined by the voltage value thereof in step S155, the process of step S143 may be omitted. When the process of step S143 is executed, the determination based on only the information recorded in the recording unit 47 may be performed in step S155, and the process of determining the voltage value of the all-solid-state battery 29 may be omitted.

According to the modification described above, when the supply of external power is restored after being stopped, the abnormality of the all-solid-state battery 29 may be checked, so that the soundness of the battery may be diagnosed and confirmed.

(9-2. In a Case where the Power Supply to the Magnetic Detecting Unit is Switched by a Switch)

Figure 12:
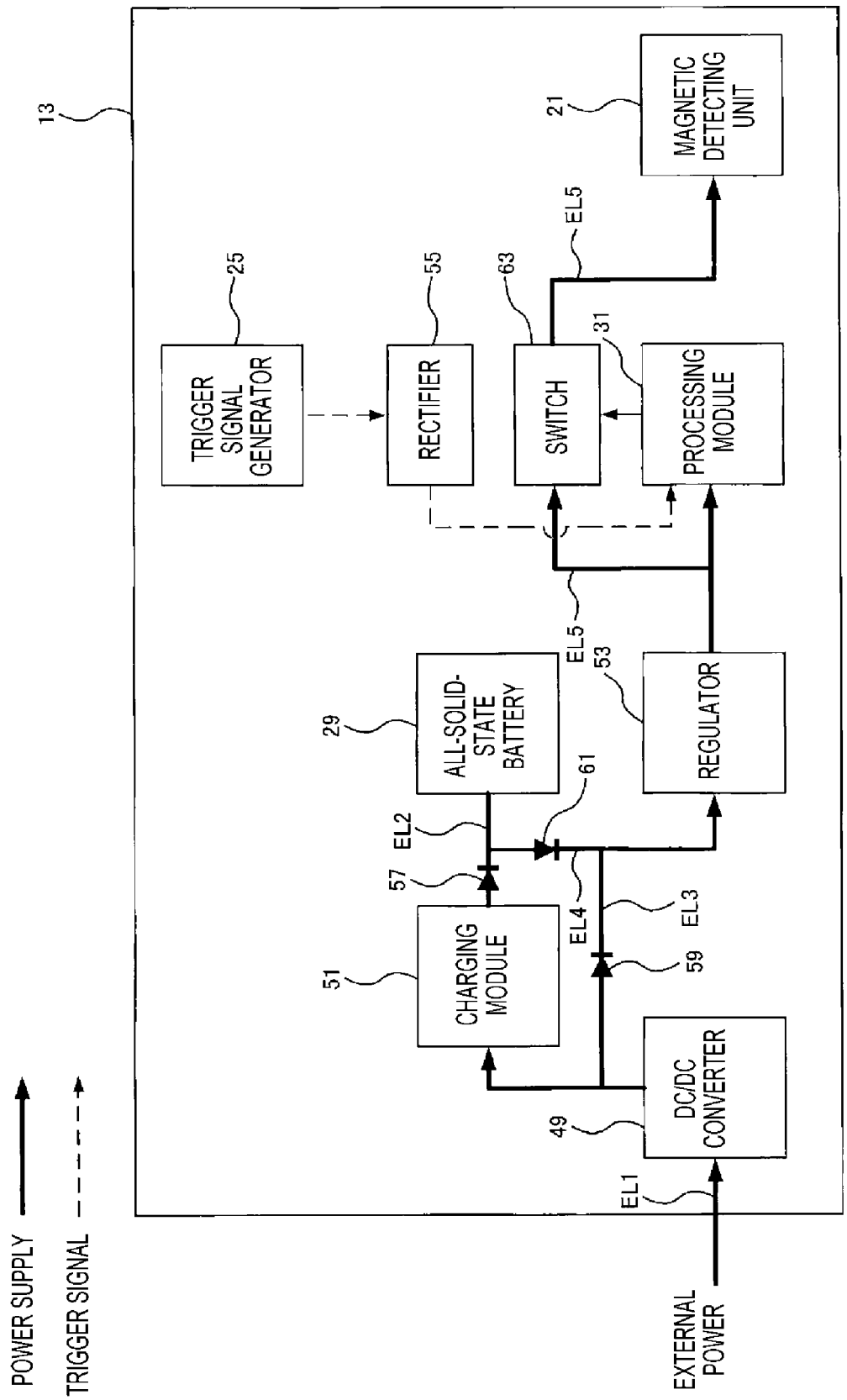
FIG. 12 is a block diagram illustrating an example of a circuit configuration of the substrate in a modification where the power supply to the magnetic detecting unit is switched by a switch.

In the embodiment, the processing module 31 itself supplies the power to the magnetic detecting unit 21 or stops the power supply. However, the power supply to the magnetic detecting unit 21 may be switched by a switch. With reference to FIG. 12, an example of a circuit configuration of the substrate 13 in the present modification will be described. In FIG. 12, the same components as those in FIG. 6 described above will be denoted by the same reference numerals as used in FIG. 6, and descriptions thereof will be omitted.

As illustrated in FIG. 12, the encoder 7 includes a switch 63 as a circuit configuration implemented on the substrate 13, in addition to the configuration illustrated in FIG. 6 described above. The switch 63 may only have a function of switching a circuit, such as, for example, a load switch or a transistor. The switch 63 is electrically connected to a power supply line EL5 between the regulator 53 and the magnetic detecting unit 21. The switching operation using the switch 63 is controlled by the processing module 31. The regulator 53 outputs the power output from the DC/DC converter 49 or the all-solid-state battery 29 to the processing module 31 and the switch 63.

When the external power is supplied to the encoder 7, the processing module 31 turns ON the switch 63. As a result, the power output from the regulator 53 is supplied to the magnetic detecting unit 21. When the external power is not supplied to the encoder 7, the processing module 31 enters the sleep mode, and turns OFF the switch 63. As a result, the power supply from the all-solid-state battery 29 to the magnetic detecting unit 21 is stopped.

When the trigger signal is received from the trigger signal generating unit 25 via the rectifier 55 in the sleep mode, the processing module 31 enters the active mode, and turns ON the switch 63. As a result, the power from the all-solid-state battery 29 is supplied to the magnetic detecting unit 21. The processing module 31 turns OFF the switch 63 after acquiring the A-phase signal and the B-phase signal from the magnetic detecting unit 21. As a result, the power supply from the all-solid-state battery 29 to the magnetic detecting unit 21 is stopped.

The contents of each process such as, for example, the count arithmetic process executed by the processing module 31 are the same as those in the above-described embodiment. According to the present modification, it is possible to apply a processing module that does not have the function of supplying a voltage to the magnetic detecting unit 21, and the versatility of the processing module may be improved.

(9-3. In a Case where the Processing Module is Turned OFF when the Supply of External Power is Stopped)

Figure 13:
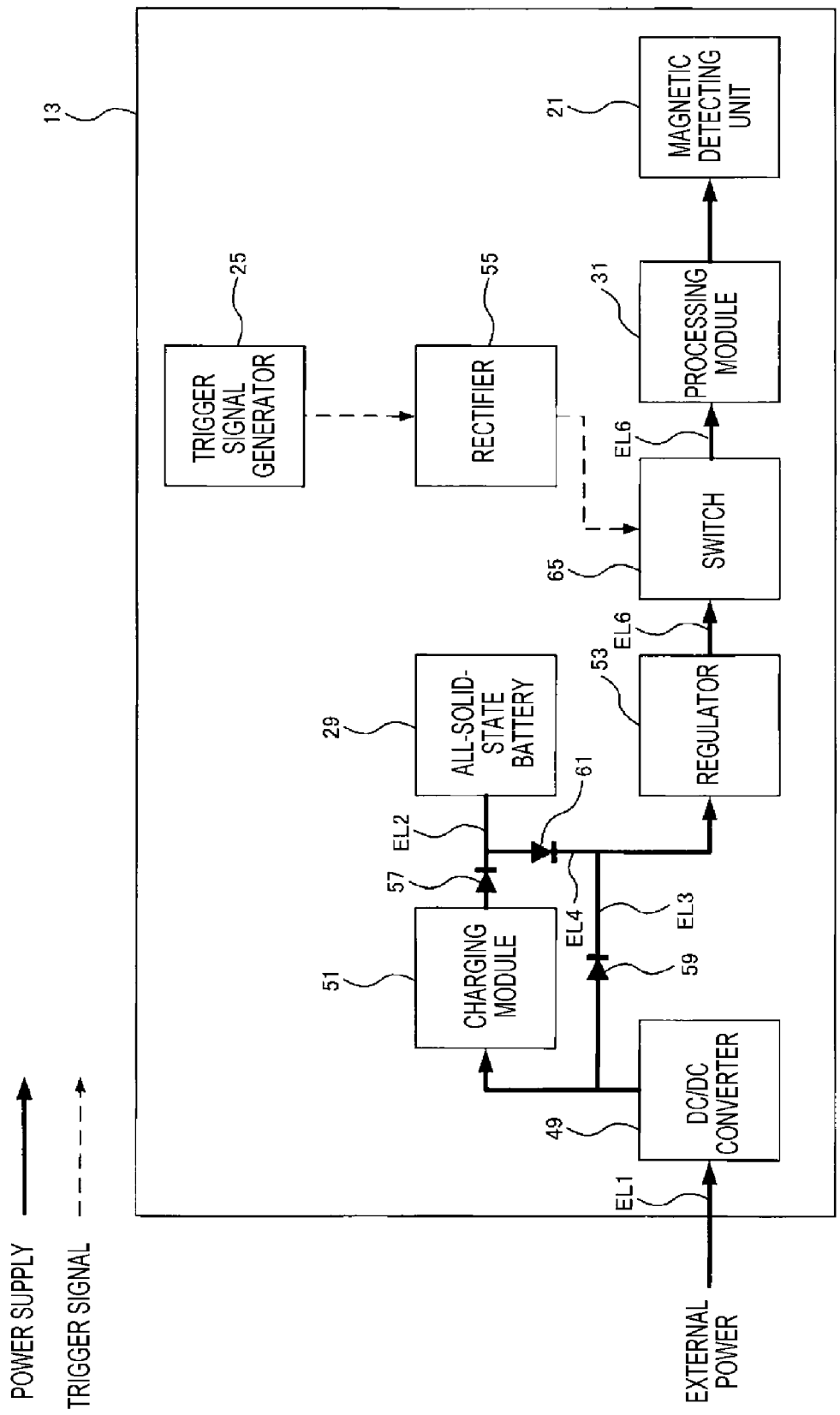
FIG. 13 is a block diagram illustrating an example of a circuit configuration of the substrate in a modification where the processing module is turned OFF when the supply of external power is stopped.

In the embodiment, the processing module 31 is caused to sleep when the supply of external power is stopped. However, the processing module 31 may be turned OFF. With reference to FIG. 13, an example of a circuit configuration of the substrate 13 in the present modification will be described. In FIG. 13, the same components as those in FIG. 6 described above will be denoted by the same reference numerals as used in FIG. 6, and descriptions thereof will be omitted.

As illustrated in FIG. 13, the encoder 7 includes a switch 65 as a circuit configuration implemented on the substrate 13, in addition to the configuration illustrated in FIG. 6 described above. The switch 65 may only have the function of switching a circuit, such as, for example, a load switch or a transistor. The switch 65 is electrically connected to a power supply line EL6 between the regulator 53 and the processing module 31. The switching operation using the switch 65 is performed by the trigger signal input from the trigger signal generator 25 via the rectifier 55. The regulator 53 outputs the power output from the DC/DC converter 49 or the all-solid-state battery 29 to the switch 65.

The switch 65 is turned ON when the external power is supplied to the encoder 7. As a result, the power output from the regulator 53 is supplied to the processing module 31. The switch 65 is turned OFF when the external power is not supplied to the encoder 7. As a result, the power supply from the all-solid-state battery 29 to the processing module 31 is stopped, and the processing module 31 enters a stopped state.

In a case where the trigger signal is received from the trigger signal generating unit 25 via the rectifier 55 when the supply of external power is stopped, the switch 65 is turned ON. As a result, the power from the all-solid-state battery 29 is supplied to the processing module 31, and the processing module 31 is started. The switch 65 is turned OFF when a predetermined time elapses after the trigger signal is received. As a result, the power supply from the all-solid-state battery 29 to the processing module 31 is stopped. For example, the predetermined time is set to be equal to or more than the sum of the time Td required from the generation of the trigger signal to the start of the processing module 31 and the times t1 to t6 during which the processing module 31 executes the respective processes. In the present modification, the time Td is longer than the time Td (see, e.g., FIG. 7) in the above-described embodiment, by the time for executing the process of starting the processing module 31.

The contents of each process such as, for example, the count arithmetic process executed by the process module 31 are the same as those in the above-described embodiment. According to the present modification, it is possible to apply a processing module that does not have the function of sleep mode, and the versatility of the processing module may be improved.

(9-4. Miscellaneous)

Figure 14:
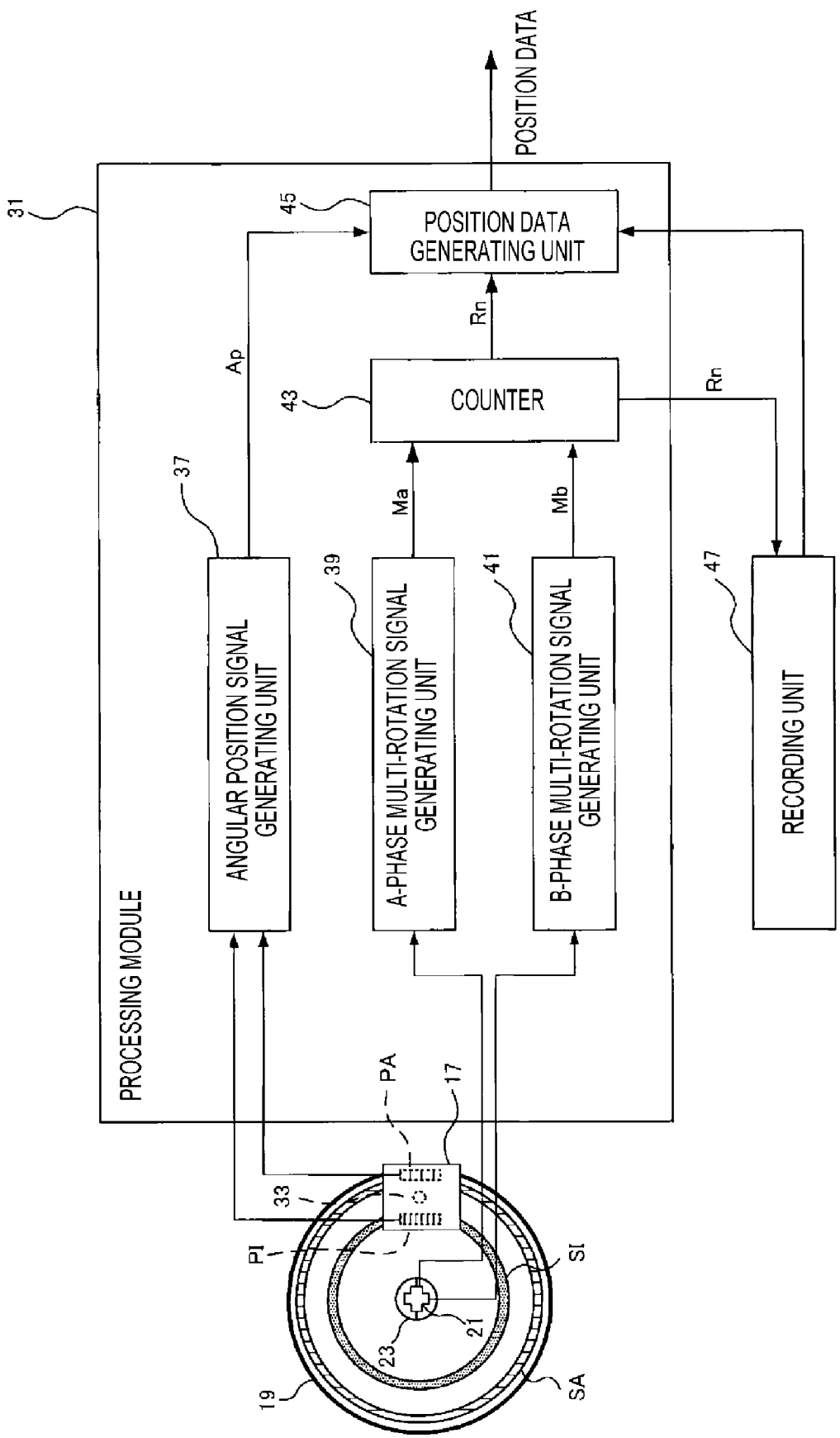
FIG. 14 is a block diagram illustrating an example of a functional configuration of the processing module in a modification where a recording unit is provided outside the processing module.

In the embodiment, the processing module 31 includes the recording unit 47 therein. However, the process module 31 may not include the recording unit 47. As illustrated in FIG. 14, the recording unit 47 may be provided outside the processing module 31. For example, the recording unit 47 may be provided on the substrate 13. In this case, it is possible to apply a processing module having no nonvolatile memory, and the versatility of the processing module may be improved.

In the embodiment, the optical module 17 is a reflection type optical module. However, the optical module 17 may be a transmission type optical module. In this case, for example, the light source 33 and the light receiving arrays PA and PI may be arranged on the opposite sides with the disk 19 interposed between the light source 33 and the light receiving arrays PA and PI, and each slit of the slit arrays SA and SI of the disk 19 may be formed as a transmission slit (e.g., a hole).

In the embodiment, one type of an incremental pattern is formed on the disk 19. However, a plurality of types of incremental patterns having different pitches may be formed on the disk 19. In this case, it is possible to generate an angular position signal having a higher resolution based on the plurality of incremental signals having different resolutions.

The problems sought to be solved by the embodiment and the effects of the embodiment are not limited to those described above. That is, the embodiment may solve a problem that is not described herein or may achieve an effect that is not described herein. Further, the embodiment may solve only a portion of the problems described herein or may achieve only a portion of the effects described herein.

Example of Hardware Configuration of Processing Module

Figure 15:
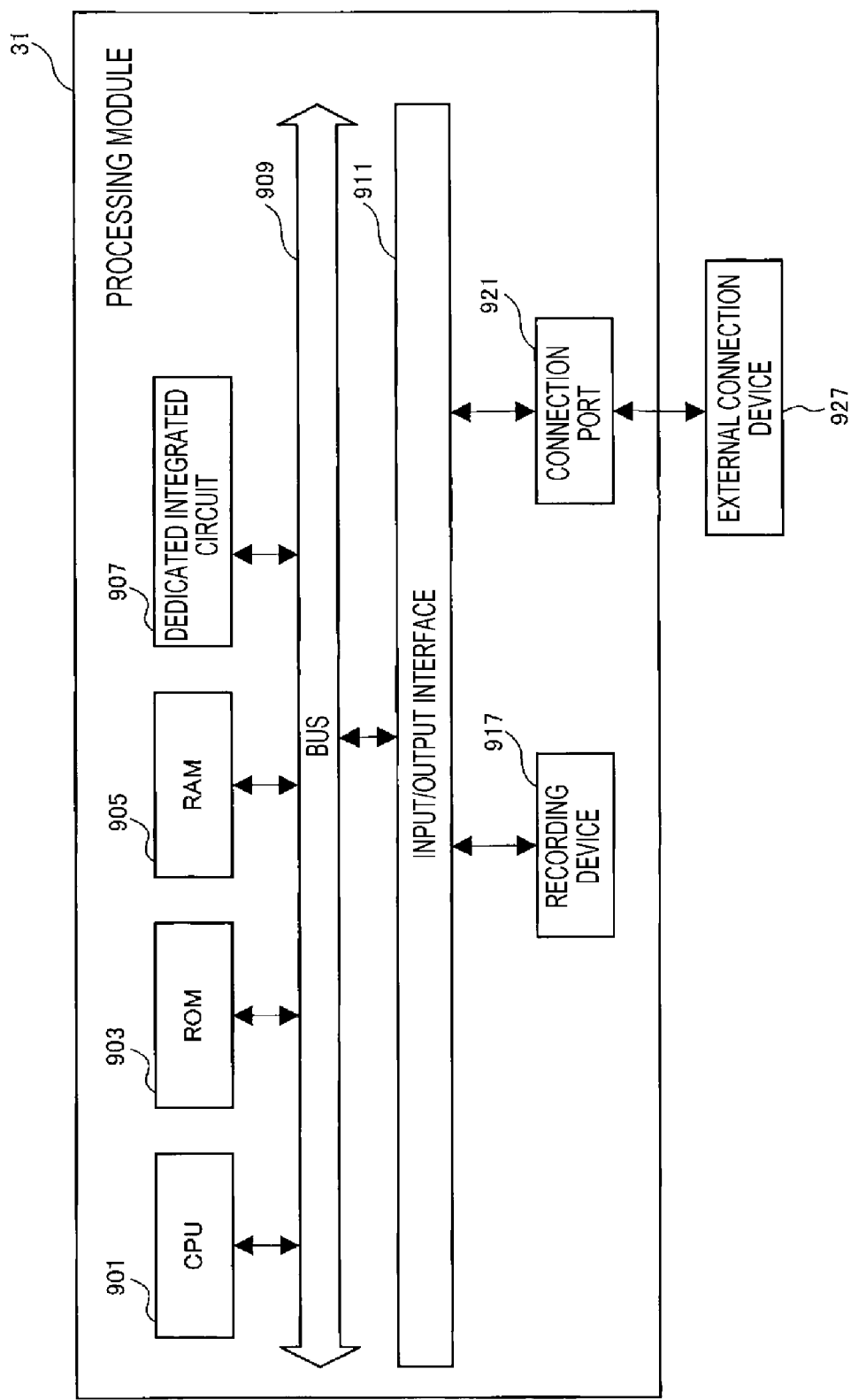
FIG. 15 is a block diagram illustrating an example of a hardware configuration of the processing module.

With reference to FIG. 15, an example of a hardware configuration of the processing module 31 will be described. FIG. 15 omits the illustration of the configuration related to the function of supplying a power to the magnetic detecting unit 21.

As illustrated in FIG. 15, the processing module 31 includes, for example, a CPU 901, a ROM 903, a RAM 905, a dedicated integrated circuit 907 constructed for a specific application such as an ASIC or FPGA, a recording device 917, and a connection port 921. These components are connected to each other to transmit signals each other via a bus 909 and an input/output interface 911.

The program may be recorded in, for example, the ROM 903, the RAM 905, or the recording device 917 including the recording unit 47 described above.

The connection port 921 is used for transmitting/receiving signals to/from an external connection device 927 and for inputting/outputting a power. For example, the reception of the trigger signal from the rectifier 55, the input of the power from the regulator 53, and the output of the power to the magnetic detecting unit 21 may be performed through the connection port 921.

The processes performed by, for example, the angular position signal generating unit 37, the A-phase multi-rotation signal generating unit 39, the B-phase multi-rotation signal generating unit 41, the counter 43, and the position data generating unit 45 are implemented in the manner that the CPU 901 executes the various processes according to programs, or implemented by, for example, the dedicated integrated circuit 907. The CPU 901 may, for example, directly read the programs from the recording device 917 and execute the programs, or may execute the programs after loading the programs into the RAM 905.

Then, the CPU 901 may transmit the results obtained from executing the above-described processes to the external connection device 927 through, for example, the connection port 921, or may record the results in the recording device 917.

In the descriptions above, for example, the terms "vertical," "parallel," and "plane" do not have a strict meaning. That is, the terms "vertical," "parallel," and "plane" allow tolerances and errors in design and manufacturing, and indicate "substantially vertical," "substantially parallel," and "substantially plane."

In the descriptions above, for example, the terms "similar," "same," "equal," and "different" in an external dimension or size, a shape, a position or the like do not have a strict meaning. That is, the terms "similar," "same," "equal," and "different" allow tolerances and errors in design and manufacturing, and indicate "substantially similar," "substantially the same," "substantially equal," "substantially different."

However, the terms "same," "equal," and "different" have a strict meaning, for a value which serves as a predetermined criterion or a value that serves as a delimiter, such as a threshold value (see, e.g., the flowcharts of FIGS. 8 and 10) or a reference value.

According to, for example, an encoder of the present disclosure, the durability may be improved.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An encoder comprising:
an angular position information detector configured to detect angular position information indicating an angular position of a rotating disk within one rotation thereof;
a multi-rotation information detector including an MR element and configured to detect multi-rotation information indicating a number of rotations of the disk;
an all-solid state battery including a solid electrolyte and configured to supply a power to the multi-rotation information detector when an external power is not supplied to the encoder;
a connector configured to connect a connection terminal of the all-solid state battery to a substrate to which at least one of the angular position information detector and the multi-rotation information detector is connected, via a solder in contact with the connection terminal;
a first magnet serving as a multi-rotation magnet and of which magnetic flux being detected by the multi-rotation information detector;
an electric signal generator configured to generate an electric signal that serves as a trigger for supplying the power of the all-solid-state battery to the multi-rotation information detector based on the rotation of the disk; and
a second magnet different from the first magnet, serving as a trigger magnet, and of which magnetic flux is detected by the electric signal generator.

2. The encoder according to claim 1, further comprising:
a charger configured to charge the all-solid-state battery when the external power is supplied, and to stop the charging of the all-solid-state battery when the external power is not supplied.

3. The encoder according to claim 2, further comprising:
a rectifier electrically connected between the charger and the all-solid-state battery, and configured to regulate a current direction to a direction from the charger toward the all-solid-state battery.

4. The encoder according to claim 2, further comprising:
a control processor configured to generate position data of the disk based on at least one of the angular position information and the multi-rotation information, when the external power is supplied,
wherein the charger and the processor are connected to a power supply line of the external power, to be electrically parallel with each other.

5. The encoder according to claim 4, wherein when a supply of the external power is stopped, the control processor enters a sleep mode by the power from the battery.

6. The encoder according to claim 5, further comprising:
an electric signal generator configured to generate an electric signal in response to a rotation of the disk,
wherein the control processor receives the electric signal to be restored from the sleep mode and start the power supply to the multi-rotation information detector.

7. The encoder according to claim 1, further comprising:
a control processor configured to control a switching operation between a power supply from the battery to the multi-rotation information detector and a stop of the power supply,
wherein the control processor executes a predetermined arithmetic process based on the multi-rotation information detected by the multi-rotation information detector.

8. The encoder according to claim 7, wherein the control processor stops the power supply from the battery to the multi-rotation information detector, after acquiring the multi-rotation information from the multi-rotation information detector and before starting the predetermined arithmetic process.

9. The encoder according to claim 7, further comprising:
a nonvolatile memory capable of recording and reading data and maintaining recorded contents even when a power is OFF,
wherein the control processor records a result of the predetermined arithmetic process in the nonvolatile memory.

10. The encoder according to claim 1, further comprising:
a control processor configured to control a switching operation between a power supply from the battery to the multi-rotation information detector and a stop of the power supply,
wherein a state in which the external power is not supplied is restored to a state in which the external power is supplied, the control processor executes a process of detecting an abnormality of the battery.

11. The encoder according to claim 1, further comprising:
a control processor configured to control a switching operation between a power supply from the battery to the multi-rotation information detector and a stop of the power supply,
wherein the control processor is provided on the substrate, and
generates first position data of the disk based on at least one of the angular position information and the multi-rotation information when the external power is supplied, and
generates second position data of the disk based on the multi-rotation information detected by the multi-rotation information detector using the power supplied from the battery, when the external power is not supplied.

12. A servo motor comprising:
a motor in which a rotor rotates around a stator; and
the encoder of claim 1 configured to detect at least one of a position, speed, and acceleration of the rotor.

13. The encoder according to claim 1, wherein the first magnet is disposed on a rotational axis of the disk.

14. The encoder according to claim 13, wherein the second magnet is disposed at an outer peripheral side of the first magnet in a radial direction around the rotational axis of the disk.

15. The encoder according to claim 1, wherein the disk includes a slit array including a plurality of slits that is detected by the angular position information detector, and the slit array is disposed between the magnet and the electric signal generator in a direction of a rotational axis of the disk.

16. The encoder according to claim 1, wherein:
the angular position information detector includes an optical module and is disposed on a surface of the substrate that faces the disk, and
the electric signal generator is disposed on a surface the substrate that is opposite to the disk.

17. The encoder according to claim 1, wherein the connector connects the connection terminal that is integrally provided on the all-solid-state battery to the substrate via the solder.

18. The encoder according to claim 1, wherein the all-solid state battery includes a pair of connection terminals provided at both ends thereof in a direction parallel to the substrate.

19. A method of controlling an encoder, comprising:
providing the encoder including:
an angular position information detector configured to detect angular position information indicating an angular position of a rotating disk within one rotation thereof;
a multi-rotation information detector including an MR element and configured to detect multi-rotation information indicating a number of rotations of a disk;
an all-solid state battery including a solid electrolyte and configured to supply a power to the multi-rotation information detector when an external power is not supplied to the encoder;
a connector configured to connect a connection terminal of the all-solid state battery to a substrate to which at least one of the angular position information detector and the multi-rotation information detector is connected, via a solder in contact with the connection terminal;
a first magnet serving as a multi-rotation magnet and of which magnetic flux being detected by the multi-rotation information detector;
an electric signal generator configured to generate an electric signal that serves as a trigger for supplying the power of the all-solid-state battery to the multi-rotation information detector based on the rotation of the disk; and
a second magnet different from the first magnet, serving as a trigger magnet, and of which magnetic flux is detected by the electric signal generator,
causing a control processor to enter a sleep mode by the power from the all-solid state battery when a supply of the external power is stopped;
stopping the supply of the power of the all-solid state battery to the multi-rotation information detector when the control processor enters the sleep mode;
receiving an electric signal generated in response to a rotation of the disk, thereby causing the control processor to be restored from the sleep mode; and
starting the supply of the power to the multi-rotation information detector when the control processor is restored from the sleep mode.

* * * * *